US010212332B2

(12) United States Patent
Sano

(10) Patent No.: US 10,212,332 B2
(45) Date of Patent: Feb. 19, 2019

(54) IMAGE SENSOR, CALCULATION METHOD, AND ELECTRONIC DEVICE FOR AUTOFOCUS

(71) Applicant: SONY CORPORATION, Tokyo (JP)

(72) Inventor: Kenichi Sano, Kanagawa (JP)

(73) Assignee: Sony Corporation, Tokyo (JP)

( * ) Notice: Subject to any disclaimer, the term of this patent is extended or adjusted under 35 U.S.C. 154(b) by 15 days.

(21) Appl. No.: 15/318,751

(22) PCT Filed: Jun. 11, 2015

(86) PCT No.: PCT/JP2015/066829
§ 371 (c)(1),
(2) Date: Dec. 14, 2016

(87) PCT Pub. No.: WO2015/198875
PCT Pub. Date: Dec. 30, 2015

(65) Prior Publication Data
US 2017/0118398 A1 Apr. 27, 2017

(30) Foreign Application Priority Data
Jun. 24, 2014 (JP) .................................. 2014-128834

(51) Int. Cl.
H04N 5/232 (2006.01)
H04N 5/369 (2011.01)
(Continued)

(52) U.S. Cl.
CPC .......... *H04N 5/23212* (2013.01); *G02B 7/34* (2013.01); *G06K 9/4604* (2013.01); *G06T 7/40* (2013.01);
(Continued)

(58) Field of Classification Search
CPC .... H04N 5/23216; H04N 5/357; H04N 9/045; H04N 5/3745; H04N 5/23212;
(Continued)

(56) References Cited

U.S. PATENT DOCUMENTS 6,781,632 B1 * 8/2004 Ide ........................ G03B 13/00
250/201.2
9,609,228 B2 * 3/2017 Kuboi .................. H04N 5/2353
(Continued)

FOREIGN PATENT DOCUMENTS

JP 2007-155929 A 6/2007
JP 2009-141390 A 6/2009
(Continued)

OTHER PUBLICATIONS

International Search Report prepared by the Japan Patent Office dated Aug. 12, 2015, for International Application No. PCT/JP2015/066829.

*Primary Examiner* — Twyler Haskins
*Assistant Examiner* — Akshay Trehan
(74) *Attorney, Agent, or Firm* — Sheridan Ross P.C.

(57) ABSTRACT

The present disclosure relates to an image sensor, calculation method, and electronic device that increase flexibility of the arrangement of light-shielded pixels and detect the phase difference with high precision. According to an aspect of the present disclosure, an image sensor includes: a pixel unit in which light-shielded pixels are arranged among normal pixels; a setting unit (texture determination unit) configured to determine texture around the light-shielded pixel as a pixel of interest present in a region of interest, and set a weighting coefficient on the basis of the texture; a calculation unit (correlation calculation unit) configured to calculate a correlation value between a pixel value of the light-shielded pixel and a pixel value of the normal pixel around the light-shielded pixel; and a generation unit (phase differ-
(Continued)

ence calculation unit) configured to generate a degree-of-correlation histogram. The present disclosure is applicable to an imaging apparatus with focal plane phase detection AF.

19 Claims, 20 Drawing Sheets

(51) Int. Cl.
G06K 9/46 (2006.01)
G06T 7/40 (2017.01)
G02B 7/34 (2006.01)
H04N 5/357 (2011.01)
H04N 9/04 (2006.01)
H04N 5/367 (2011.01)
H04N 5/3745 (2011.01)

(52) U.S. Cl.
CPC ... H04N 5/23216 (2013.01); H04N 5/232122 (2018.08); H04N 5/357 (2013.01); H04N 5/367 (2013.01); H04N 5/3696 (2013.01); H04N 5/36961 (2018.08); H04N 9/045 (2013.01); H04N 5/3745 (2013.01)

(58) Field of Classification Search
CPC ....... H04N 5/232122; H04N 5/232123; H04N 5/232125; H04N 5/232127; H04N 5/232133; H04N 5/3696; H04N 5/36961; G06K 9/4604; G06T 7/40; G02B 7/34
See application file for complete search history.

(56) References Cited

U.S. PATENT DOCUMENTS

| | | | | |
|---|---|---|---|---|
| 2009/0037137 A1* | 2/2009 | Takeda | ......... | G01B 11/002 702/150 |
| 2009/0167927 A1* | 7/2009 | Kusaka | ......... | G06T 3/00 348/345 |
| 2009/0213235 A1* | 8/2009 | Watanabe | ......... | H04N 5/23248 348/208.4 |
| 2010/0194967 A1* | 8/2010 | Amano | ......... | G02B 7/34 348/345 |
| 2010/0302433 A1* | 12/2010 | Egawa | ......... | G02B 7/34 348/345 |
| 2011/0109775 A1* | 5/2011 | Amano | ......... | H04N 5/23212 348/241 |
| 2012/0057057 A1* | 3/2012 | Amano | ......... | G02B 7/365 348/294 |
| 2012/0154637 A1* | 6/2012 | Hara | ......... | H04N 5/23212 348/239 |
| 2013/0100338 A1* | 4/2013 | Iwasaki | ......... | G03B 3/10 348/353 |
| 2013/0288286 A1* | 10/2013 | Sugiyama | ......... | C12M 41/46 435/29 |
| 2014/0028896 A1* | 1/2014 | Oshima | ......... | H04N 5/23212 348/350 |
| 2014/0092220 A1* | 4/2014 | Kawamura | ......... | H04N 9/045 348/49 |
| 2014/0176780 A1* | 6/2014 | Koshiba | ......... | G02B 7/34 348/336 |
| 2014/0211051 A1* | 7/2014 | Sugawara | ......... | G02B 7/34 348/273 |
| 2014/0267839 A1* | 9/2014 | Nishimaki | ......... | H04N 5/367 348/246 |
| 2014/0307139 A1* | 10/2014 | Tanaka | ......... | H04N 5/3696 348/280 |
| 2015/0036029 A1* | 2/2015 | Theuwissen | ......... | H04N 9/045 348/273 |
| 2015/0222805 A1* | 8/2015 | Murata | ......... | G02B 7/34 348/349 |
| 2015/0234148 A1* | 8/2015 | Kusaka | ......... | G02B 7/34 348/349 |
| 2015/0243032 A1* | 8/2015 | Ely | ......... | G06K 9/4647 382/103 |

FOREIGN PATENT DOCUMENTS

| | | |
|---|---|---|
| JP | 2009-217252 A | 9/2009 |
| JP | 2009-244854 A | 10/2009 |
| JP | 2011-033975 | 2/2011 |
| JP | 2012-173334 A | 9/2012 |

* cited by examiner

IMAGE SENSOR, CALCULATION METHOD, AND ELECTRONIC DEVICE FOR AUTOFOCUS

CROSS REFERENCE TO RELATED APPLICATIONS

This application is a national stage application under 35 U.S.C. 371 and claims the benefit of PCT Application No. PCT/JP2015/066829 having an international filing date of 11 Jun. 2015, which designated the United States, which PCT application claimed the benefit of Japanese Patent Application No. 2014-128834 filed 24 Jun. 2014, the disclosures of which are incorporated herein by reference in their entirety.

TECHNICAL FIELD

The present disclosure relates to image sensors, calculation methods, and electronic devices. More particularly, the present disclosure relates to an image sensor, calculation method, and electronic device which are suitable for use in implementation of a focal plane phase detection autofocus (AF) function.

BACKGROUND ART

Among the conventionally known autofocusing techniques is focal plane phase detection AF. A solid-state image sensor which achieves focal plane phase detection AF is provided with normal pixels for obtaining a pixel signal, and in addition, light-shielded pixels for pupil division of incident light, which are located at predetermined positions. More specifically, a plurality of pairs of a right-side light-shielded pixel, a right side of the light receiving surface of which is shielded from light, and a left-side light-shielded pixel, a left side of the light receiving surface of which is shielded from light, are arranged in a plurality of straight lines. The focal point position of a lens is adjusted on the basis of a phase difference obtained from the light-shielded pixels (see, for example, Patent Literature 1).

CITATION LIST

Patent Literature

Patent Literature 1: JP 2011-33975A

DISCLOSURE OF INVENTION

Technical Problem

As described above, when pairs of a right-side light-shielded pixel and a left-side light-shielded pixel are provided, there have been significant constraints on the arrangement of the light-shielded pixels and the phase difference detection region, in simultaneously achieving the reduction of degradation of image quality and the high-precision detection of a phase difference.

With such circumstances in mind, the present disclosure has been made so that the flexibility of the arrangement of light-shielded pixels can be increased and the phase difference can be detected with high precision.

Solution to Problem

An image sensor according to a first aspect of the present disclosure includes: a pixel unit in which light-shielded pixels are arranged among normal pixels arranged in a matrix; a setting unit configured to determine texture around the light-shielded pixel as a pixel of interest present in a region of interest, and set a weighting coefficient on the basis of the texture; a calculation unit configured to calculate a correlation value between a pixel value of the light-shielded pixel as the pixel of interest and a pixel value of the normal pixel around the light-shielded pixel; and a generation unit configured to multiply the correlation value calculated for the light-shielded pixel by the weighting coefficient, and calculate integration for the light-shielded pixels present in the region of interest, to generate a degree-of-correlation histogram.

The generation unit may further detect a phase difference between the light-shielded pixel present in the region of interest and the normal pixel around the light-shielded pixel, on the basis of the generated degree-of-correlation histogram.

The setting unit may generate a normal pixel line located in a light-shielded direction of the light-shielded pixel while the light-shielded pixel as the pixel of interest is set as a center of the normal pixel line, determine texture of the normal pixel line, and set the weighting coefficient based on the texture.

The setting unit may generates, by interpolation, a normal pixel line located in a light-shielded direction of the light-shielded pixel while the light-shielded pixel as the pixel of interest is set as a center of the normal pixel line, the normal pixel line having same color as a color of the light-shielded pixel.

The setting unit may remove noise of the generated normal pixel line, determine texture of the normal pixel line after the noise removal, and set the weighting coefficient on the basis of the texture.

The setting unit may perform, as the texture determination, at least one of dynamic range determination, monotonic increase/decrease determination, or saturation determination.

The image sensor according to the first aspect of the present disclosure further includes a selection unit configured to select the region of interest.

The selection unit may select the region of interest on the basis of a section selected by a user in a screen which is divided into a plurality of sections.

The selection unit may extract, as the region of interest, regions having a uniform depth in the section selected by the user.

The calculation unit may correct a luminance value of the light-shielded pixel as the pixel of interest, and calculate a correlation value between the luminance value after the correction and a luminance value of the normal pixel around the light-shielded pixel.

The generation unit may calculate a degree of reliability of the detected phase difference on the basis of the generated degree-of-correlation histogram.

In the pixel unit, either first light-shielded pixels having a first region of a light receiving surface shielded from light or second left-side light-shielded pixels having a second region of a light receiving surface shielded from light, the second region being different from the first region, may be arranged sparsely in a light-shielded direction, and regularly and uniformly throughout a screen.

In the pixel unit, either first light-shielded pixels having a first region of a light receiving surface shielded from light or second left-side light-shielded pixels having a second region of a light receiving surface shielded from light, the second region being different from the first region, may be arranged randomly throughout a screen.

In the pixel unit, both first light-shielded pixels having a first region of a light receiving surface shielded from light and second left-side light-shielded pixels having, a second region of a light receiving surface shielded from light, the second region being different from the first region, may be arranged randomly throughout a screen.

In the pixel unit, either first light-shielded pixels having a first region of a light receiving surface shielded from light or second left-side light-shielded pixels having a second region of a light receiving surface shielded from light, the second region being different from the first region, may be arranged in a straight line in a light-shielded direction.

In the pixel unit, both first light-shielded pixels having a first region of a light receiving surface shielded from light and second left-side light-shielded pixels having a second region of a light receiving surface shielded from light, the second region being different from the first region, may be arranged in pairs in a straight line in a light-shielded direction.

In the pixel unit, either first light-shielded pixels having a first region of a light receiving surface shielded from light or second left-side light-shielded pixels having a second region of a light receiving surface shielded from light, the second region being different from the first region, may be arranged in a plurality of lines.

In the pixel unit, both first light-shielded pixels having a first region of a light receiving surface shielded from light and second left-side light-shielded pixels having a second region of a light receiving surface shielded from light, the second region being different from the first region, may be arranged in pairs in a plurality of lines.

A method according to the first aspect of the present disclosure is a method for calculating phase differences between light-shielded pixels and normal pixels around the light-shielded pixels in an image sensor including a pixel unit in which the light-shielded pixels are arranged among the normal pixels arranged in a matrix, the method including: a setting step of determining texture around the light-shielded pixel as a pixel of interest present in a region of interest, and setting a weighting coefficient on the basis of the texture; a calculation step of calculating a correlation value between a pixel value of the light-shielded pixel as the pixel of interest and a pixel value of the normal pixel around the light-shielded pixel; and a detection step of multiplying the correlation value calculated for the light-shielded pixel by the weighting coefficient, calculating integration for the light-shielded pixels present in the region of interest, to generate a degree-of-correlation histogram, and detecting a phase difference between the light-shielded pixel present in the region of interest and the normal pixel around the light-shielded pixel, on the basis of the generated degree-of-correlation histogram. The steps are performed by the image sensor.

An electronic device according to a second aspect of the present disclosure includes an image sensor. The image sensor includes a pixel unit in which light-shielded pixels are arranged among normal pixels arranged in a matrix, a setting unit configured to determine texture around the light-shielded pixel as a pixel of interest present in a region of interest, and set a weighting coefficient on the basis of the texture, a calculation unit configured to calculate a correlation value between a pixel value of the light-shielded pixel as the pixel of interest and a pixel value of the normal pixel around the light-shielded pixel, and a generation unit configured to multiply the correlation value calculated for the light-shielded pixel by the weighting coefficient, and calculate integration for the light-shielded pixels present in the region of interest, to generate a degree-of-correlation histogram.

In the first and second aspects of the present disclosure, texture around a light-shielded pixel as a pixel of interest present in a region of interest is determined, and a weighting coefficient is set on the basis of the texture. A correlation value between a pixel value of the light-shielded pixel as the pixel of interest and a pixel value of the normal pixel around the light-shielded pixel, is calculated. The correlation value calculated for the light-shielded pixel is multiplied by the weighting coefficient, and integration for the light-shielded pixels present in the region of interest is calculated, to generate a degree-of-correlation histogram.

Advantageous Effects of Invention

According to the first and second aspects of the present disclosure, the flexibility of the arrangement of light-shielded pixels can be increased and the phase difference can be detected with high precision.

MODE(S) FOR CARRYING OUT THE INVENTION

Best modes for carrying out the present disclosure (hereinafter referred to as embodiments) will now be described in detail with reference to the drawings.

<Configuration Examples of Imaging Apparatus to Which the Present Disclosure is Applied>

Figure 1:
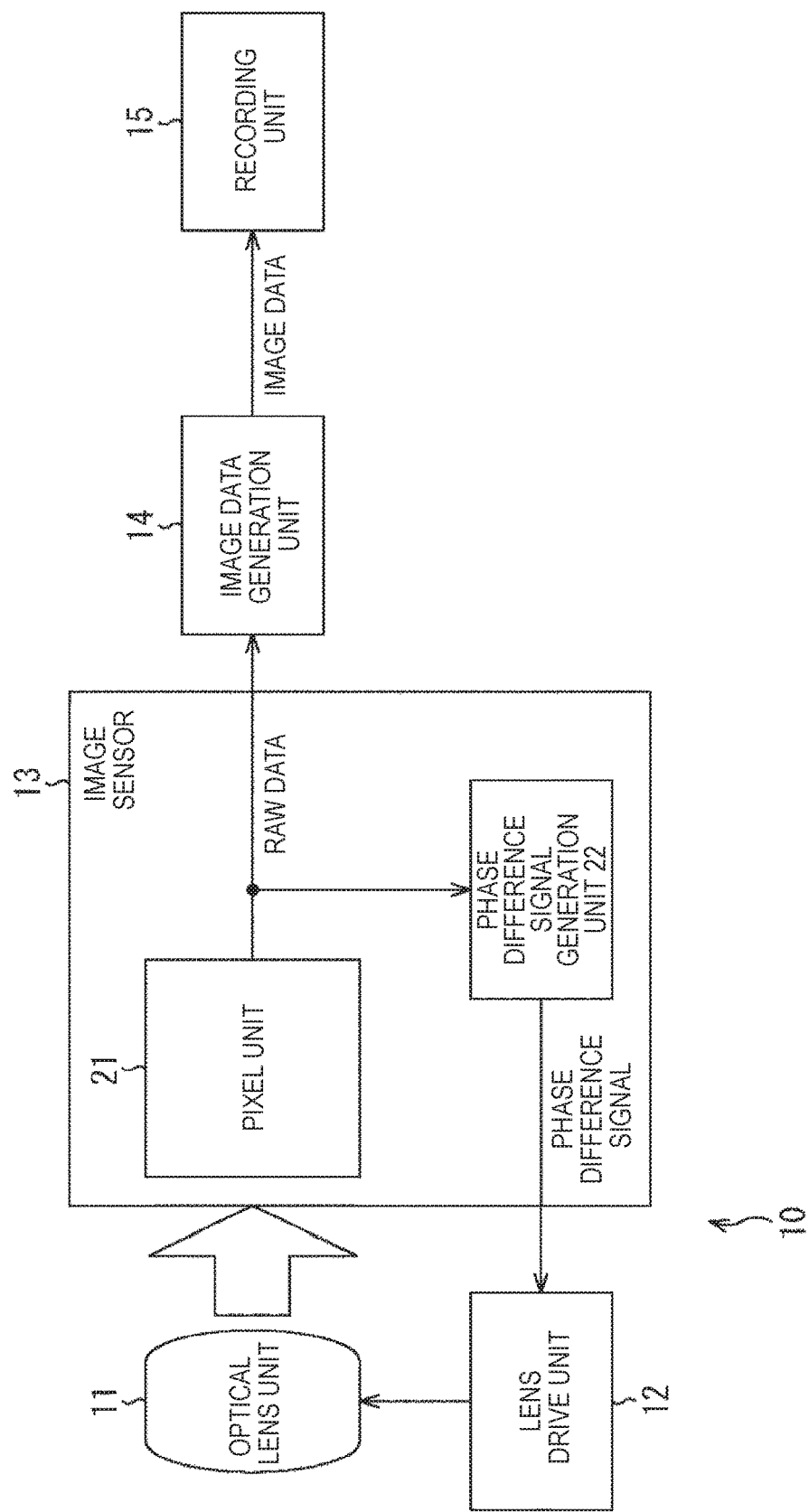
FIG. 1 is a block diagram showing a configuration example of an imaging apparatus to which the present disclosure is applied.

FIG. 1 shows a configuration example of an imaging apparatus to which the present disclosure is applied. The imaging apparatus 10 has a focal plane phase detection AF function, and includes an optical lens unit 11, a lens drive unit 12, an image sensor 13, an image data generation unit 14, and a recording unit 15.

The optical lens unit 11 includes optical lenses, a diaphragm, and the like, and brings a subject image into focus on a pixel unit 21 of the image sensor 13. Also, the optical lens unit 11 moves focus on the basis of a focus control signal from the lens drive unit 12. The lens drive unit 12 generates a focus control signal on the basis of a phase difference signal supplied from the image sensor 13, and outputs the focus control signal to the optical lens unit 11.

The image sensor 13 has the pixel unit 21 and a phase difference signal generation unit 22. In the pixel unit 21, light-shielded pixels are arranged among a large number of normal pixels arranged in a matrix, and raw data of each pixel depending on an optical image of a subject brought into focus by the optical lens unit 11 is generated and output to the image data generation unit 14 and the phase difference signal generation unit 22.

Figure 2:
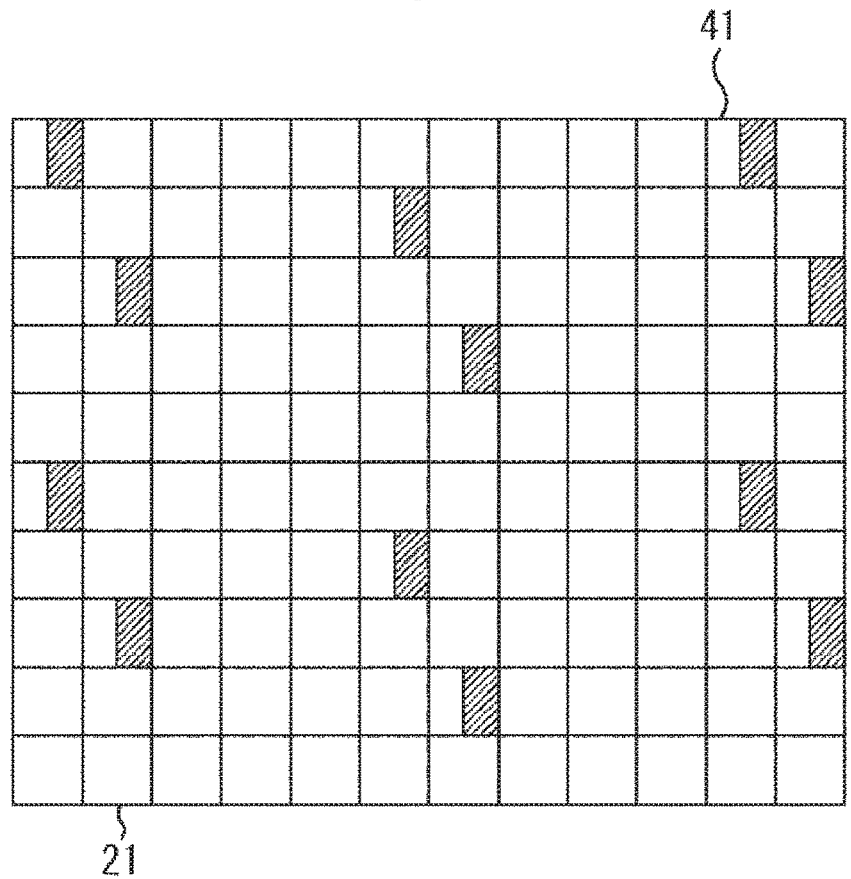
FIG. 2 is a diagram showing a first arrangement example of light-shielded pixels in a pixel unit.

FIG. 2 shows a first arrangement example of light-shielded pixels in the pixel unit 21. In the first arrangement example, right-side light-shielded pixels 41, a right side of the light receiving surface of which is shielded from light, are arranged sparsely in a light-shielded direction (a direction in which the light-shielded portions of the light receiving surfaces are aligned. Here, the horizontal direction as the right side is shielded from light), and regularly and uniformly throughout the screen. According to the first arrangement example, a phase difference can be robustly detected in various imaged scenes while a degradation in image quality is reduced. Note that other arrangement examples of the light-shielded pixels in the pixel unit 21 will be described below.

Referring back to FIG. 1, the phase difference signal generation unit 22 receives the raw data of each pixel from the pixel unit 21 to detect a phase difference signal, and outputs the detected phase difference signal to the lens drive unit 12.

The image data generation unit 14 performs a predetermined signal process on the raw data of each pixel from the pixel unit 21 to generate image data, and outputs the image data to the recording unit 15. The recording unit 15 records the image data into a predetermined recording medium, or outputs the image data to the outside.

<Detailed Configuration Example of Phase Difference Signal Generation Unit 22>

Figure 3:
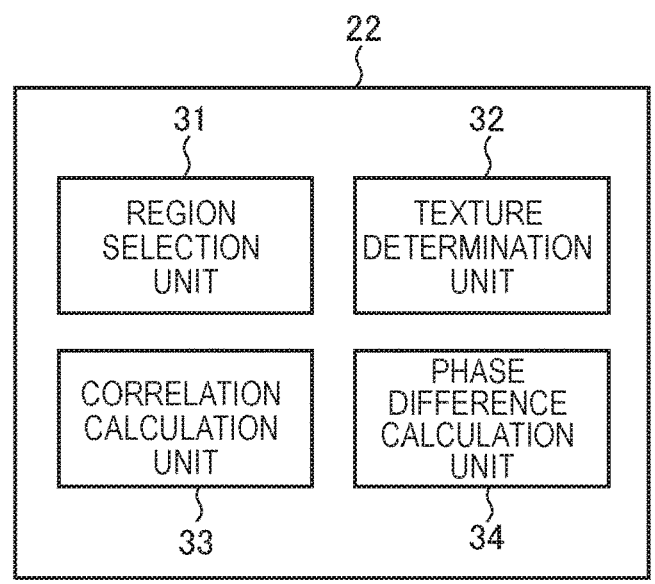
FIG. 3 is a block diagram showing a detailed configuration example of a phase difference signal generation unit.

FIG. 3 shows a detailed configuration example of the phase difference signal generation unit 22. The phase difference signal generation unit 22 includes a region selection unit 31, a texture determination unit 32, a correlation calculation unit 33, and a phase difference calculation unit 34.

The region selection unit 31 extracts a region where a phase difference is detected (a region where a subject which is brought into focus is imaged), on the screen shown by the raw data of the pixels from the pixel unit 21.

Figure 4:
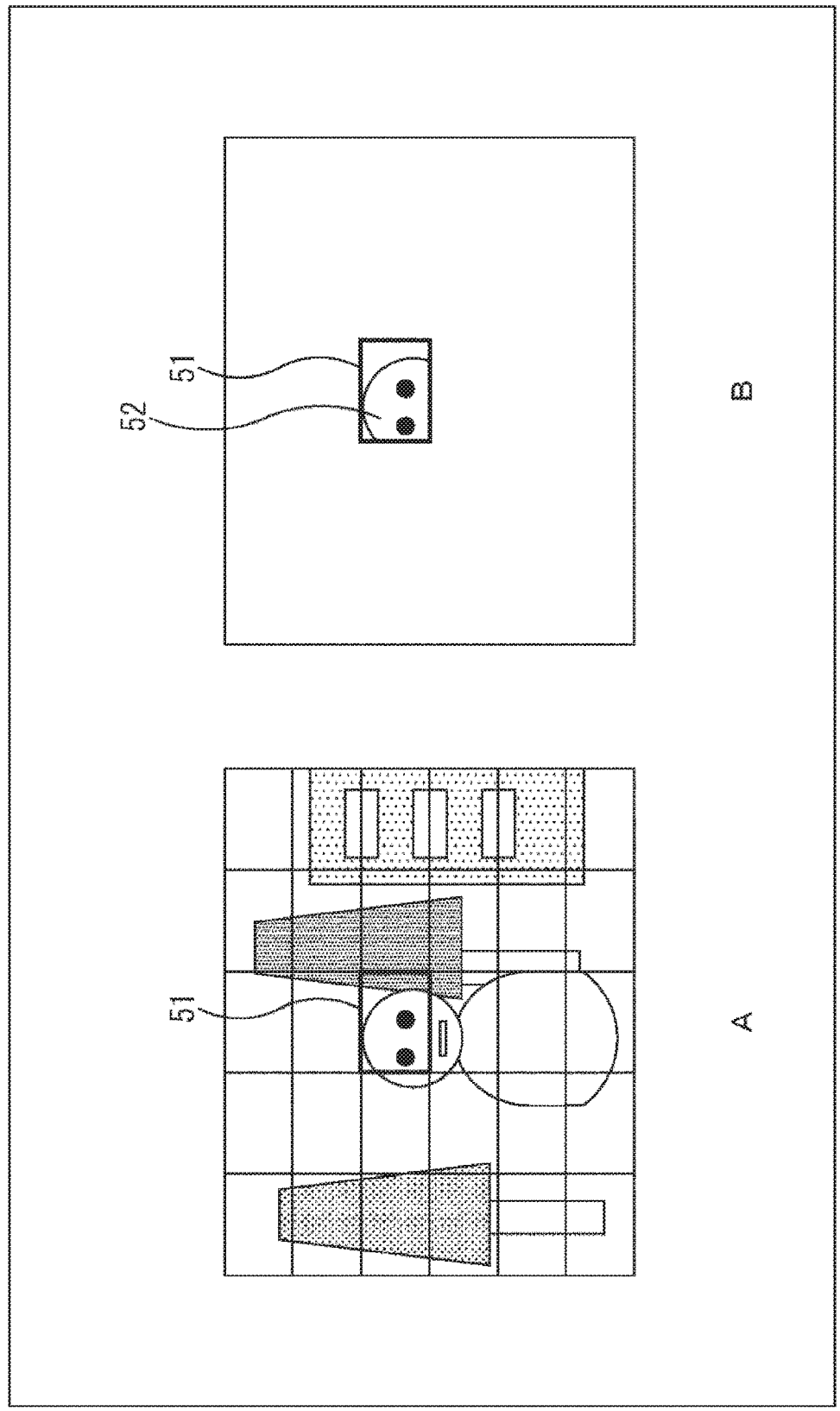
FIG. 4 is a diagram for describing a process of extracting a region where a phase difference is detected.

FIG. 4 is a diagram for describing a process of extracting a region where a phase difference is detected. As shown in FIG. 4A, a detection section 51 designated by the user is selected from an image which is divided into a plurality of rectangular sections. Next, as shown in FIG. 4B, a region 52 which is likely to have a uniform depth (a distance from the imaging apparatus 10), in the selected detection section 51, is extracted.

Note that, in this embodiment, the light-shielded pixels may not be used in pairs, and only one light-shielded pixel may be utilized. Therefore, the size and shape of the sections obtained by dividing the screen are not limited, if at least one light-shielded pixel is included. In other words, a section designated by the user can be divided into finer portions having a wider variety of shapes.

A technique of extracting a region which is likely to have a uniform depth will be described. In this embodiment, as a technique of simply and easily extracting a region which is likely to have a uniform depth, a technique of using color information and edge information is employed. A region which is likely to have a uniform depth is also hereinafter referred to as a "region having a uniform depth."

Initially, it is assumed that a region having a uniform depth has similar colors (i.e., similar ratios of R, G, and B values), and there is an edge at a boundary between regions having different depths (i.e., the differential value of a luminance value is large). Edge detection is performed in the selected detection section 51 to find a region surrounded by a detected edge. Furthermore, it is determined whether or not internal portions of the region have similar colors. Here, if it is determined that the internal portions of the region have similar colors, the region is extracted as a region having a uniform depth.

Furthermore, as another technique, a facial recognition technique or the like may be employed, and a region individually identified by the technique may be dealt with as a region having a uniform depth.

Referring back to FIG. 3, the texture determination unit 32 generates a normal pixel line corresponding to each light-shielded pixel present in the region 52 extracted by the region selection unit 31.

Figure 5:
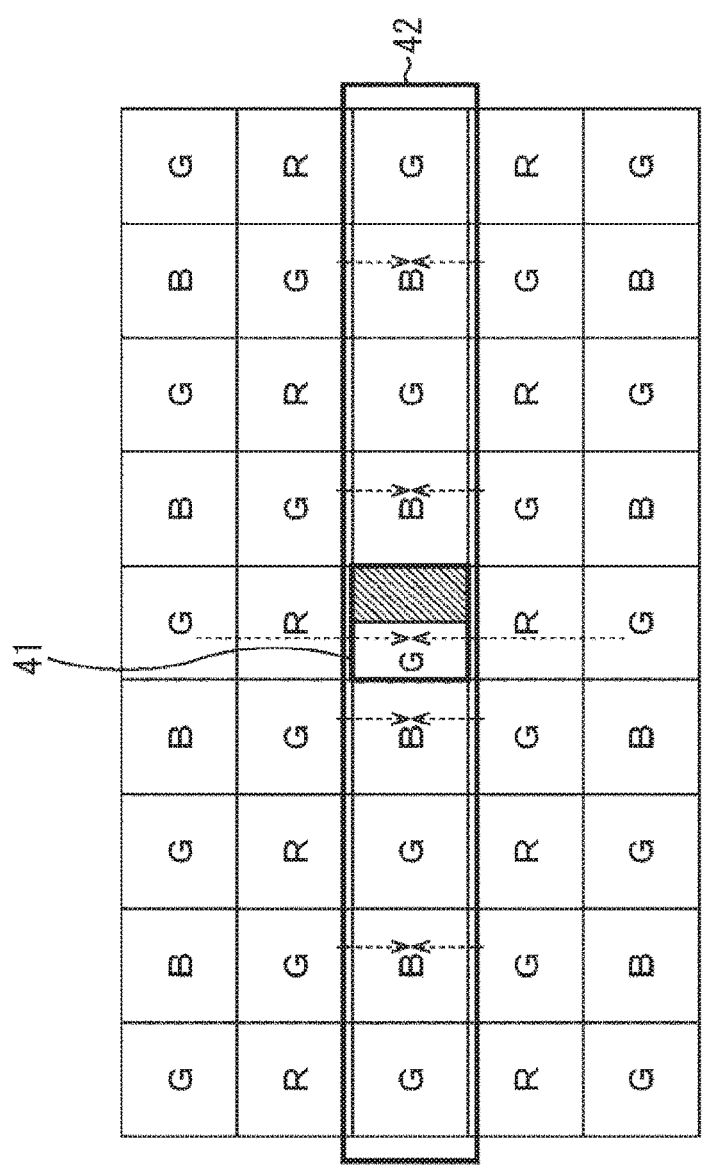
FIG. 5 is a diagram for describing generation of a normal pixel line corresponding to a light-shielded pixel.

FIG. 5 is a diagram for describing generation of a normal pixel line corresponding to a light-shielded pixel. When a normal pixel line corresponding to a light-shielded pixel 41 located in a center of FIG. 5 is generated, attention is paid to a pixel line 42 having a predetermined length (in FIG. 5, 9 pixels) in the light-shielded direction with the light-shielded pixel 41 being located at the center of the pixel line 42. Next, in the pixel line 42 of interest, normal pixels having a color (in FIG. 5, B) different from the color (in FIG. 5, G) at the position of the light-shielded pixel 41 are subjected to interpolation using normal pixels neighboring the light-shielded pixel 41 and having the same color (in FIG. 5, G) as that at the position of the light-shielded pixel 41. Also, the light-shielded pixel 41 is also subjected to interpolation using normal pixels neighboring the light-shielded pixel 41 and having the same color (in FIG. 5, G) as that at the position of the light-shielded pixel 41. As a result, generated is a normal pixel line having a predetermined length in the light-shielded direction with the light-shielded pixel 41 being located at the center of the normal pixel line, and having the color (in FIG. 5, G) at the position of the light-shielded pixel 41.

Also, the texture determination unit 32 performs a low pass filter (LPF) process or the like on the generated normal pixel line to remove noise, performs texture determination on the normal pixel line from which noise has been removed, and sets a weighting coefficient, depending on the determination result.

Specifically, as the texture determination, dynamic range determination, monotonic increase/decrease determination, saturation determination, or the like is performed.

In the dynamic range determination, it is determined whether or not the difference (dynamic range) between the highest pixel value and the lowest pixel value in a normal pixel line is greater than a predetermined threshold. In the monotonic increase/decrease determination, the differential value of the pixel value between each adjacent pixel in a normal pixel line is calculated, and it is determined whether it is satisfied that the differential values are invariably greater than a predetermined threshold indicating monotonic increase, or it is satisfied that the differential values are invariably smaller than a predetermined threshold indicating monotonic decrease. In the saturation determination, it is determined whether a pixel value in a normal pixel line is greater than a predetermined upper limit threshold or smaller than a predetermined lower limit threshold.

For a light-shielded pixel (a normal pixel line corresponding thereto) with respect to which it is considered on the basis of these three determination results that a clear phase difference occurs in the normal pixel line and can be detected with high precision without erroneous detection, the weighting coefficient during phase difference detection is set to a great value.

Figure 6:
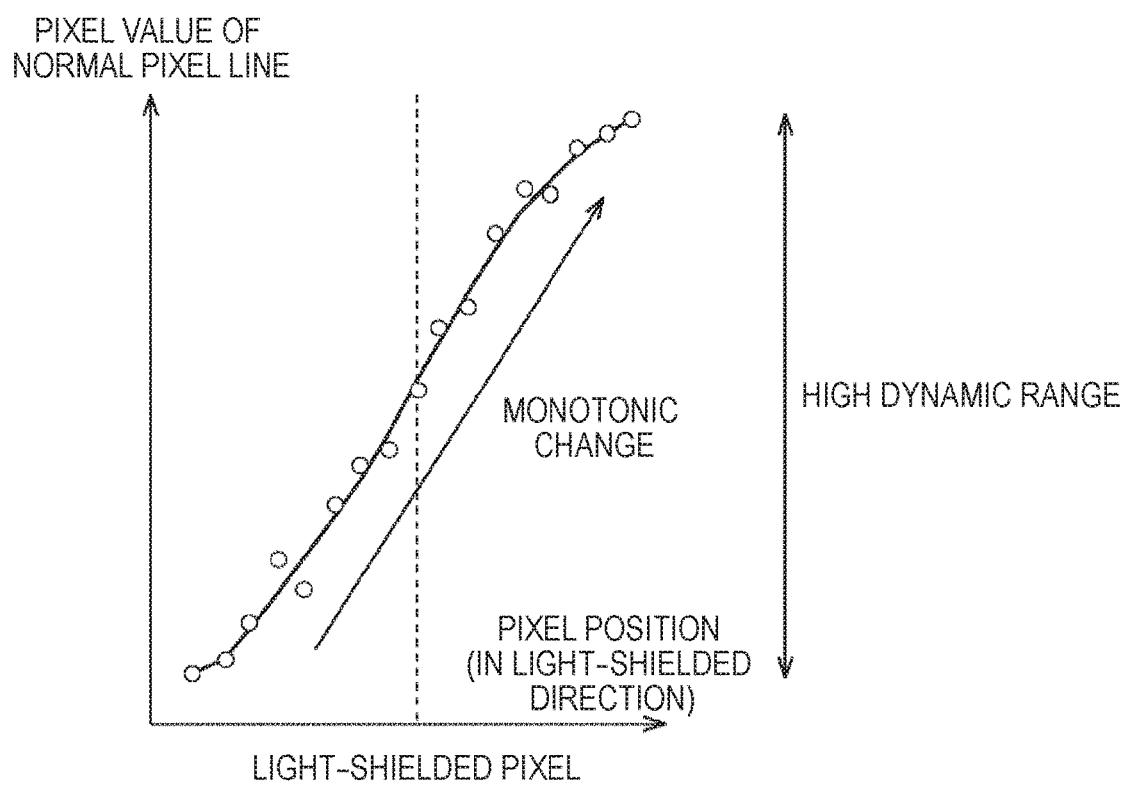
FIG. 6 is a diagram for describing se ng of a weighting coefficient on the basis of texture determination.
Figure 7:
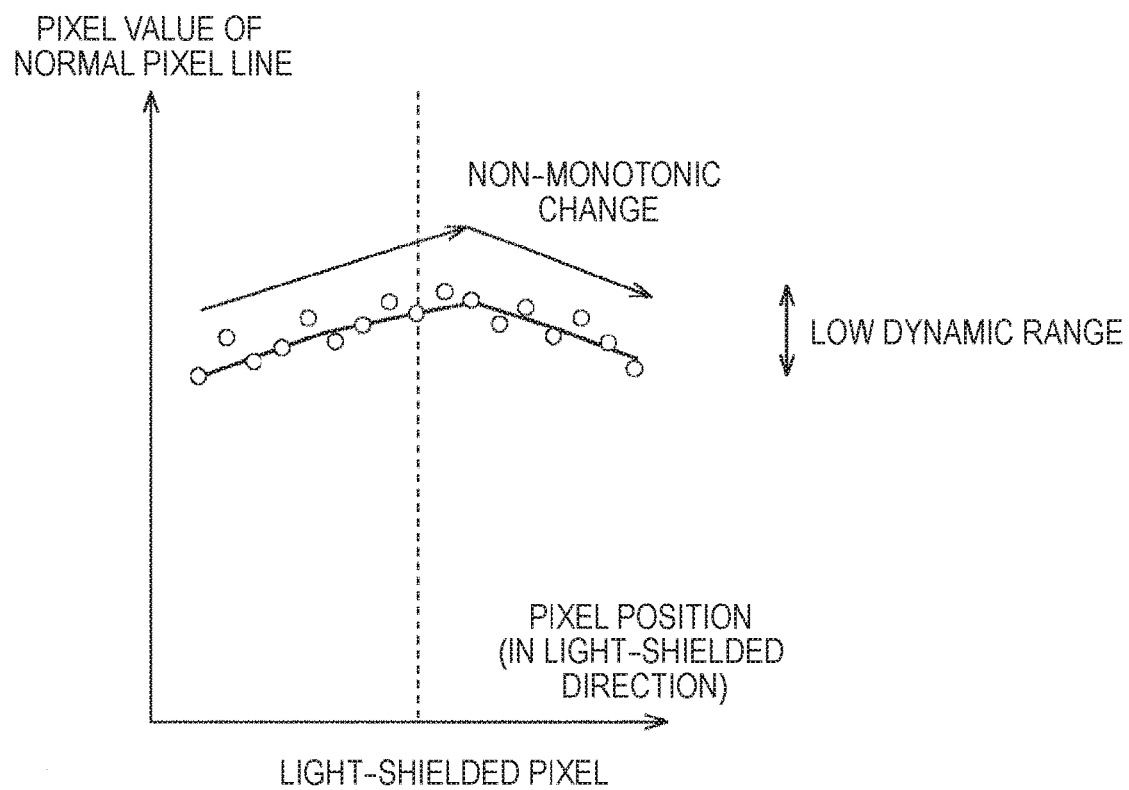
FIG. 7 is a diagram for describing, setting of a weighting coefficient on the basis of texture determination.

Specifically, for example, as shown in FIG. 6, when the dynamic range of the pixel values is wide and the changes in the pixel values are monotonic, it is considered that a phase difference can be detected with high precision without erroneous detection, and therefore, the weighting coefficient is set to a great value. Also, conversely, for example, as shown in FIG. 7, when the dynamic range of the pixel values is narrow and the changes in the pixel values are not monotonic, it is considered that a phase difference is likely to be erroneously detected, and therefore, the weighting coefficient is set to a small value.

Note that, for the texture determination, at least one of the above dynamic range determination, monotonic increase/decrease determination, and saturation determination may be performed, and on the basis of the result, the weighting coefficient may be set.

The correlation calculation unit 33 performs sensitivity correction on each light-shielded pixel present in the region extracted by the region selection unit 31, and calculates a correlation value (optionally a difference value) in the pixel value (luminance value) between the light-shielded pixel 41 after the sensitivity correction and normal pixels neighboring the light-shielded pixel 41 (the above pixel line before the interpolation of the normal pixel line).

Note that, instead of the correlation value, a difference value may be calculated. Also, the sensitivity correction of a light-shielded pixel may not be performed.

The sensitivity correction of a light-shielded pixel will be described. Light-shielded pixels are shielded from light and therefore the amount of light received is proportionately reduced. Therefore, light-shielded pixels have a smaller luminance value than those of normal pixels neighboring the light-shielded pixels, which are not shielded from light, and therefore, are subjected to sensitivity correction in which the luminance value is multiplied by a gain according to the light shield ratio. The light shield ratio of each light-shielded pixel may be referred to by using a correction table calculated in advance, or by referring to a light shield ratio which has been calculated on the basis of the pixel value of a light-shielded pixel in a flat portion neighboring the light-shielded pixel, without using the correction table.

In the technique of using a correction table, the correction table is produced in advance by applying the pixel value (luminance value) of a neighboring normal pixel and a light-shielded pixel obtained when a plain subject is imaged to the following expression (1), and thereby calculating the light shield ratio of the light-shielded pixel (=the pixel value of the light-shielded pixel/the pixel value of the normal pixel neighboring the light-shielded pixel), and is stored.

The light shield ratio of a light-shielded pixel=the pixel value of the light-shielded pixel/the pixel value of a normal pixel neighboring the light-shielded pixel (1)

Thereafter, during the sensitivity correction, the light shield ratio of a light-shielded pixel is acquired from the correction table, and the pixel value after the sensitivity correction is calculated using the following expression (2).

The pixel value of a light-shielded pixel after the sensitivity correction=the luminance value before the correction/the light shield ratio (2)

In a technique in which the correction table is not used, a light-shielded pixel which is present in a flat portion around a light-shielded pixel of interest is searched for, a light shield ratio corresponding to a found light-shielded pixel is calculated by expression (1), and a pixel value after the sensitivity correction is calculated using expression (2), assuming that the obtained light shield ratio is the light shield ratio of the light-shielded pixel of interest.

The correlation calculation of a light-shielded pixel and normal pixels will be described. When a light-shielded pixel has been subjected to the luminance correction, a difference value (the sum of absolute differences (SAD) value or the sum of squared differences (SSD) value, etc.) between the light-shielded pixel and normal pixels is calculated as a correlation value of the light-shielded pixel and the normal pixels, as shown on the left side of FIG. 8.

When a light-shielded pixel has not been subjected to the luminance correction, an inner product value (normalized cross-correlation (NCC) value), etc.) of the light-shielded pixel and normal pixels is calculated as a correlation value of the light-shielded pixel and the normal pixels.

Figure 8:
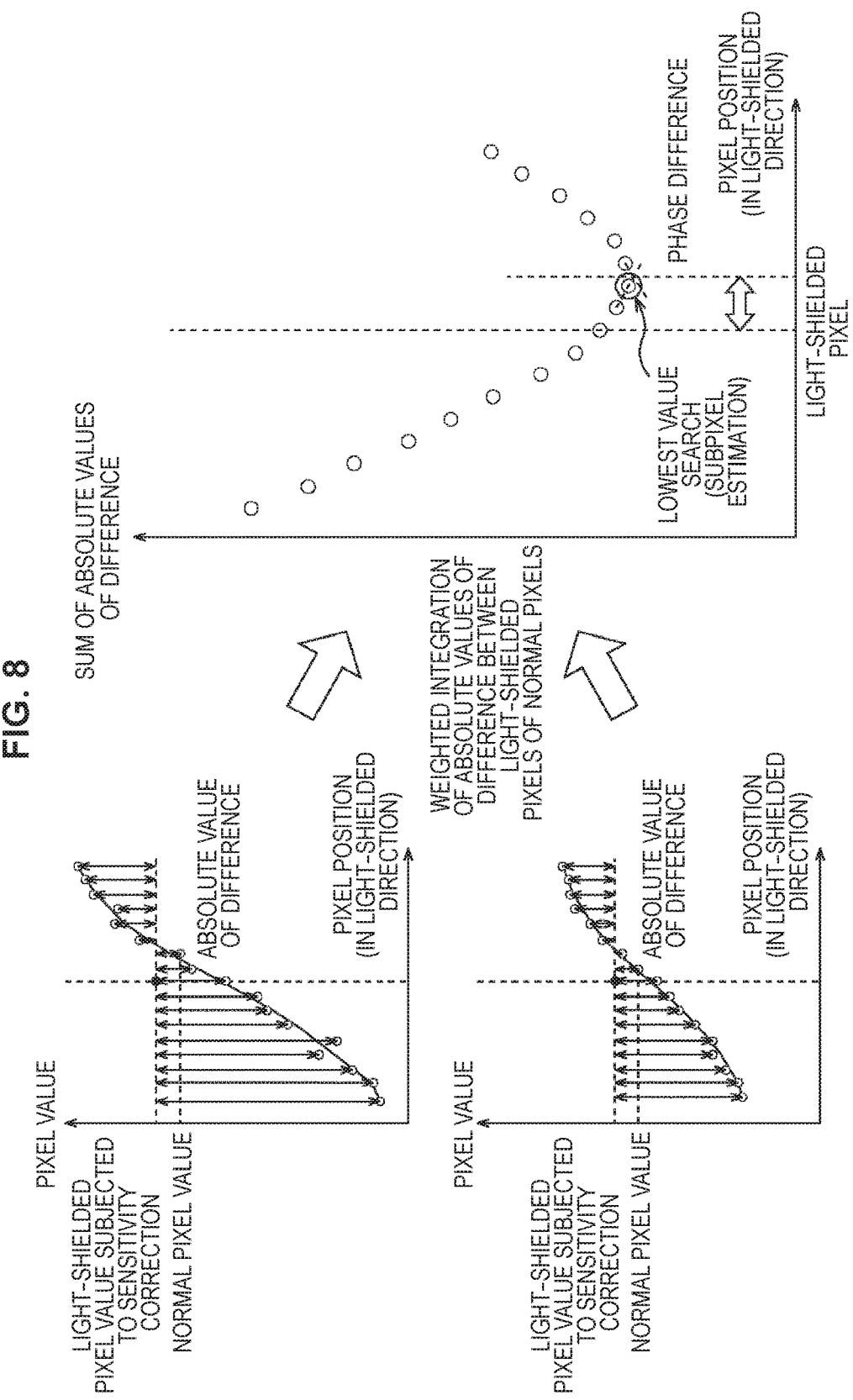
FIG. 8 is a diagram for describing a process of generating a degree-of-correlation histogram.

Referring back to FIG. 3, the phase difference calculation unit 34 multiplies a correlation value calculated for each light-shielded pixel present in the region extracted by the region selection unit 31, by the weighting coefficient set by the texture determination unit 32, and integrates the resultant correlation values, to generate a degree-of-correlation histogram as shown on the right side of FIG. 8, and detects a phase difference on the basis of the degree-of-correlation histogram.

The detection of a phase difference on the basis of the degree-of-correlation histogram will be described. Initially, in the degree-of-correlation histogram as shown in FIG. 8, the position of a point where the correlation value is largest (the difference value is smallest) is searched for on a pixel-by-pixel basis. Furthermore, by performing subpixel estimation where subpixels are obtained by dividing each pixel, a point where the correlation value is largest is found on a subpixel-by-subpixel basis. A difference value between this point found on a subpixel-by-subpixel basis and the position of a light-shielded pixel is detected as a phase difference between the light-shielded pixel and normal pixels.

Furthermore, the phase difference calculation unit 34 determines the degree of reliability of the phase difference which has been detected on the basis of the shape, value, number of light-shielded pixels that are integrated, and the like of the degree-of-correlation histogram.

Note that the phase difference output from the phase difference calculation unit 34 is a phase difference between a light-shielded pixel and normal pixels. If a left-side light-shielded pixel is present in the image unit 21 in addition to the right-side light-shielded pixel 41, a phase difference between the left-side light-shielded pixel and normal pixels can also be obtained. In this case, if a phase difference between the right-side light-shielded pixel 41 and normal pixels and a phase difference between the normal pixels and the left-side light-shielded pixel are added together, a phase difference between the right-side light-shielded pixel 41 and the left-side light-shielded pixel can be obtained.

<Phase Difference Detection Process>

Figure 9:
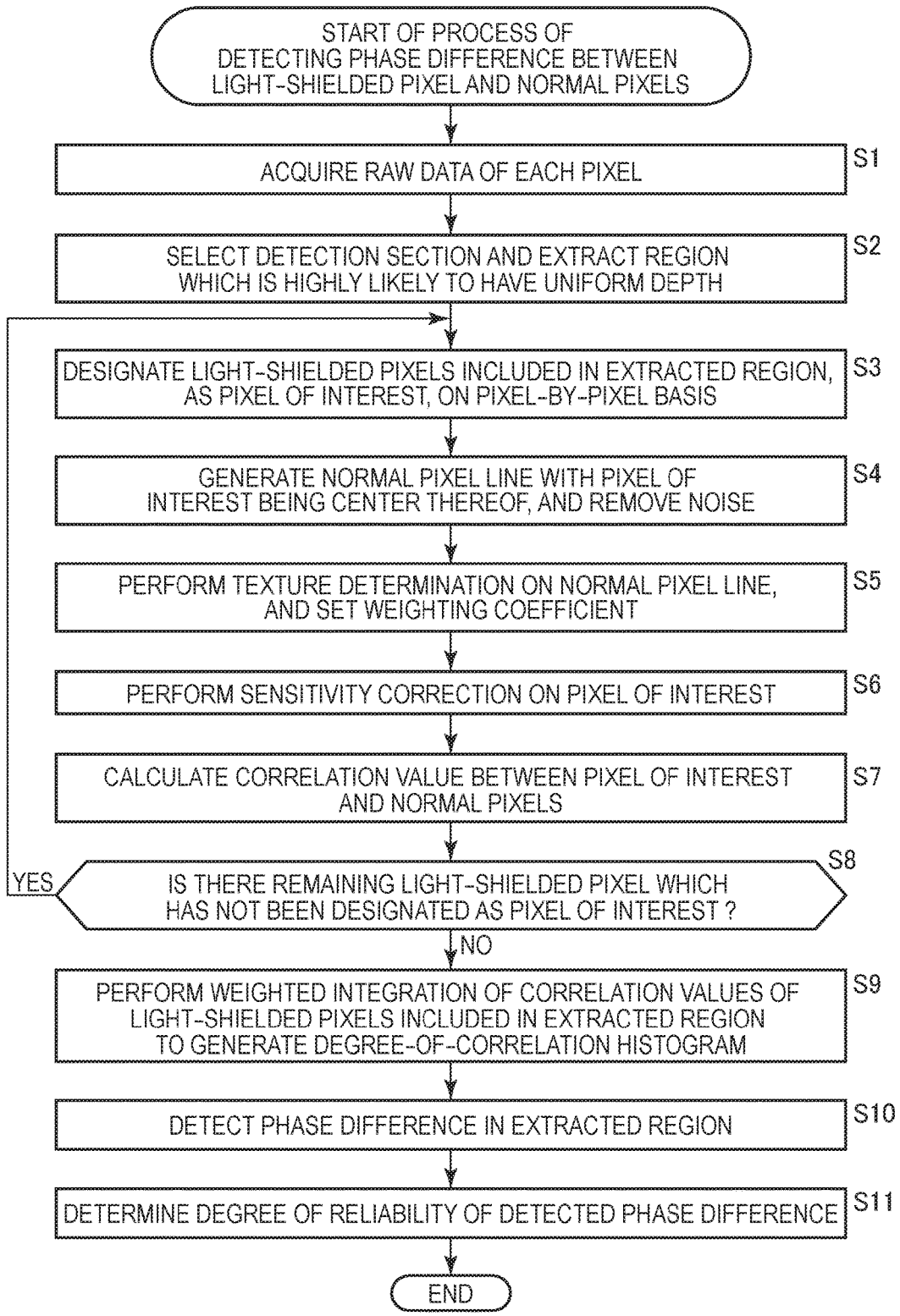
FIG. 9 is a flowchart for describing a process of detecting, a phase difference.

Next, FIG. 9 is a flowchart for describing a process of detecting a phase difference between a light-shielded pixel and normal pixels, which is performed by the phase difference signal generation unit 22.

In step S1, the phase difference signal generation unit 22 acquires raw data of each pixel from the pixel unit 21. In step S2, the region selection unit 31 selects a detection section 51 in which a phase difference is detected, on a screen shown by the raw data of the pixels from the pixel unit 21, according to the user's operation, and in addition, extracts a region 52 having a uniform depth in the detection section 51.

In step S3, the texture determination unit 32 designates each light-shielded pixel present in the region 52 extracted by the region selection unit 31 as a pixel of interest on a pixel-by-pixel basis. In step S4, the texture determination unit 32 generates a normal pixel line in the light-shielded direction with the pixel of interest being a center of the normal pixel line, and removes noise of the normal pixel line by an LPF process or the like.

In step S5, the texture determination unit 32 performs the texture determination on the normal pixel line from which noise has been removed, and sets a weighting coefficient on the basis of the determination result. In step S6, the correlation calculation unit 33 performs the luminance correction on the pixel of interest. In step S7, the correlation calculation unit 33 calculates a correlation value between the pixel of interest which has been subjected to the luminance correction and normal pixels neighboring the pixel of interest.

In step S8, the texture determination unit 32 checks whether or not there is a remaining one that has not been designated as a pixel of interest, of the light-shielded pixels present in the region 52 extracted by the region selection unit 31. If there is a remaining one that has not been designated as a pixel of interest, the process returns to step S3, and step3 and following steps are repeated. If there is not a remaining one that has not been designated as a pixel of interest, a weighting coefficient and a correlation value have been calculated for all light-shielded pixels present in the region 52 extracted by the region selection unit 31, and therefore, the process proceeds to step S9.

In step S9, the phase difference calculation unit 34 multiplies the correlation value calculated for each light-shielded pixel present in the region extracted by the region selection unit 31, by the weighting coefficient set by the texture determination unit 32, and integrates the resultant correlation values, to generate a degree-of-correlation histogram. In step S10, the phase difference calculation unit 34 detects a phase difference on a subpixel-by-subpixel basis on the basis of the generated degree-of-correlation histogram. In step S11, the phase difference calculation unit 34 determines the degree of reliability of the detected phase difference on the basis of the shape, value, number of light-shielded pixels that are integrated, and the like of the degree-of-correlation histogram.

The phase difference thus detected is supplied as a phase difference signal to the lens drive unit 12.

In the foregoing, the process of detecting a phase difference between a light-shielded pixel and normal pixels by the phase difference signal generation unit 22 has been described.

<Other Arrangement Examples of Light-Shielded Pixels in Pixel Unit 21>

As described above, the arrangement of light-shielded pixels in the pixel unit 21 is preferably the first arrangement example shown in FIG. 2, and may be other arrangements.

Figure 10:
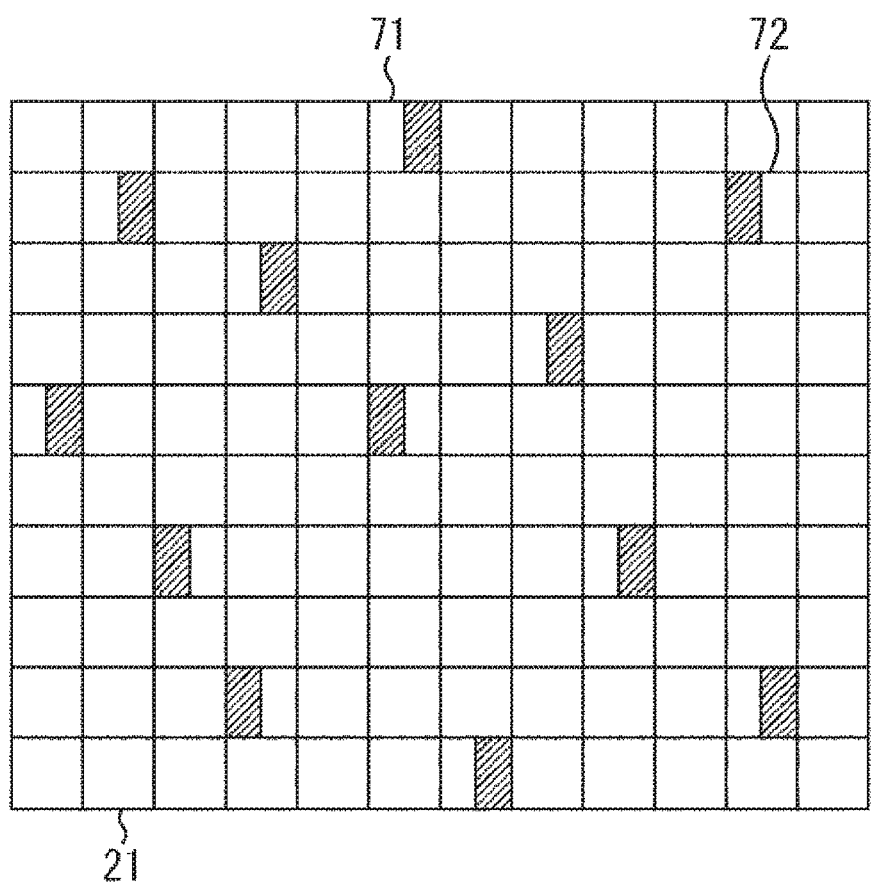
FIG. 10 is a diagram showing a second arrangement example of light-shielded pixels in a pixel unit.

FIG. 10 shows another arrangement example (second arrangement example) of light-shielded pixels in the pixel unit 21. In the second arrangement example, right-side light-shielded pixels 71, a right side of the light receiving surface of which is shielded from light, and left-side light-shielded pixels 72, a left side of the light receiving surface of which is shielded from light, are randomly arranged throughout the screen. In this embodiment, it is not necessary to arrange the light-shielded pixels in pairs, and therefore, even in the second arrangement example, a phase difference can be detected without a problem.

Figure 11:
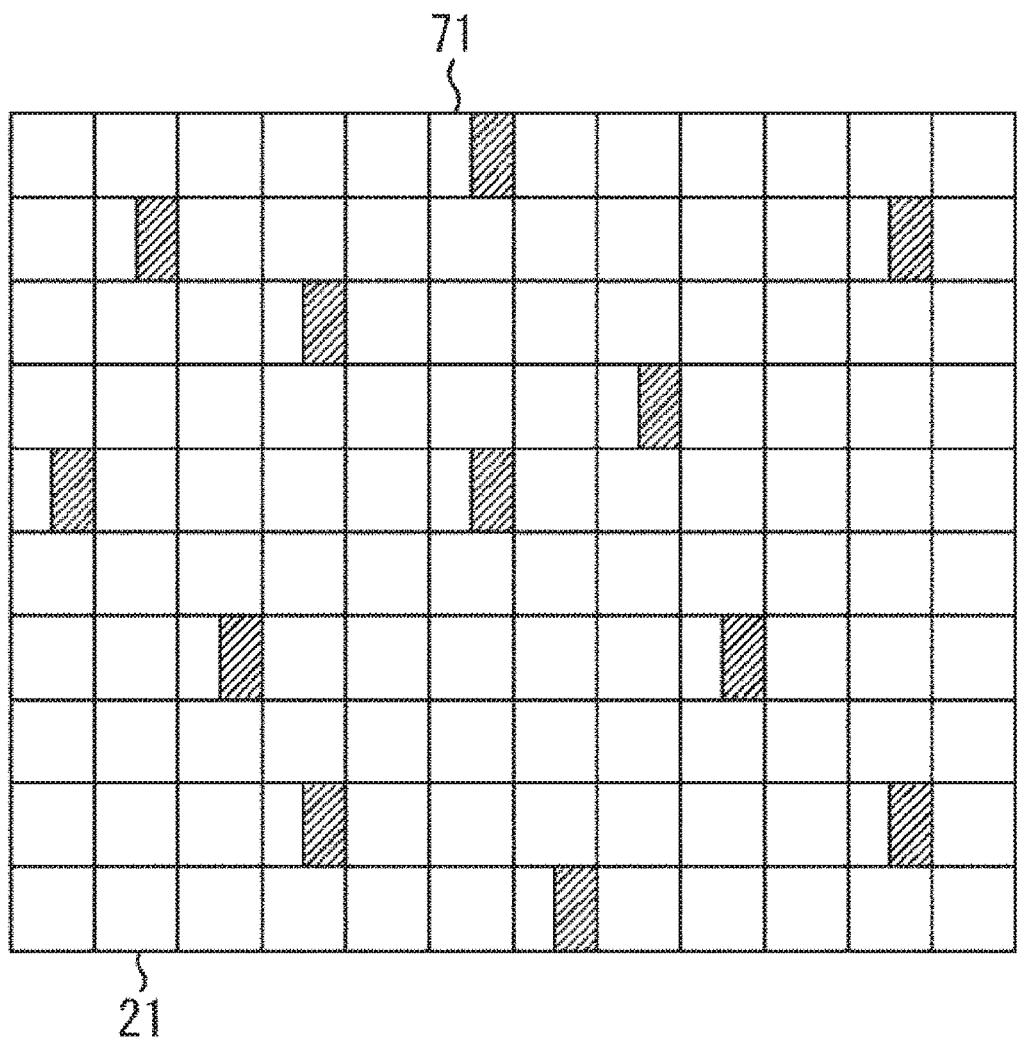
FIG. 11 is a diagram showing a third arrangement example of light shielded pixels in a pixel unit.

FIG. 11 shows still another arrangement example (third arrangement example) of light-shielded pixels in the pixel unit 21. In the third arrangement example, only right-side light-shielded pixels 71, a right side of the light receiving surface of which is shielded from light, are randomly arranged throughout the screen. In this embodiment, it is not necessary to arrange the light-shielded pixels in pairs, and therefore, even in the third arrangement example, a phase difference can be detected without a problem.

Figure 12:
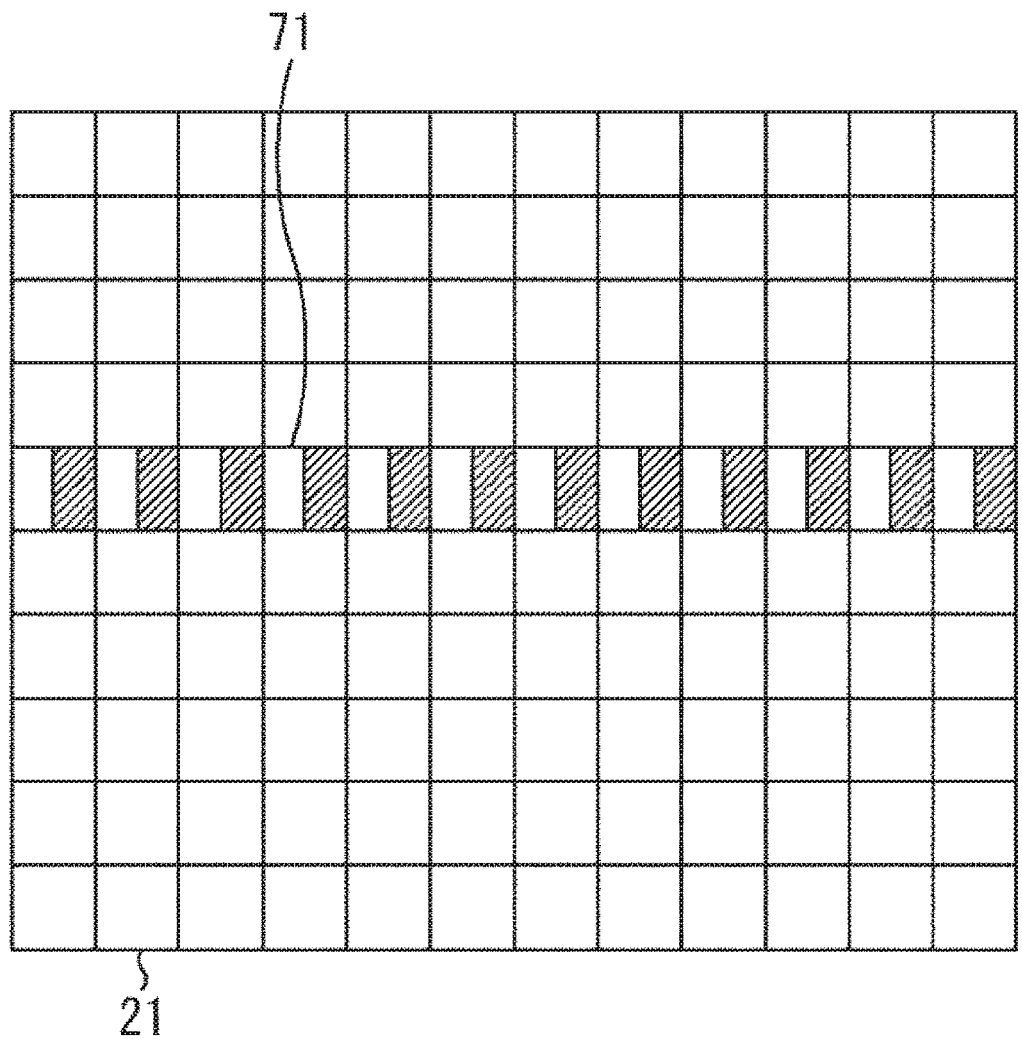
FIG. 12 is a diagram showing a fourth arrangement example of light-shielded pixels in a pixel unit.

FIG. 12 shows still another arrangement example (fourth arrangement example) of light-shielded pixels in the pixel unit 21. In the fourth arrangement example, right-side light-shielded pixels 71, a right side of the light receiving surface of which is shielded from light, are successively arranged in a straight line in the light-shielded direction (in this case, the horizontal direction as the right side is shielded form light). In this embodiment, it is not necessary to arrange the light-shielded pixels in pairs, and therefore, even in the fourth arrangement example, a phase difference can be detected without a problem.

Figure 13:
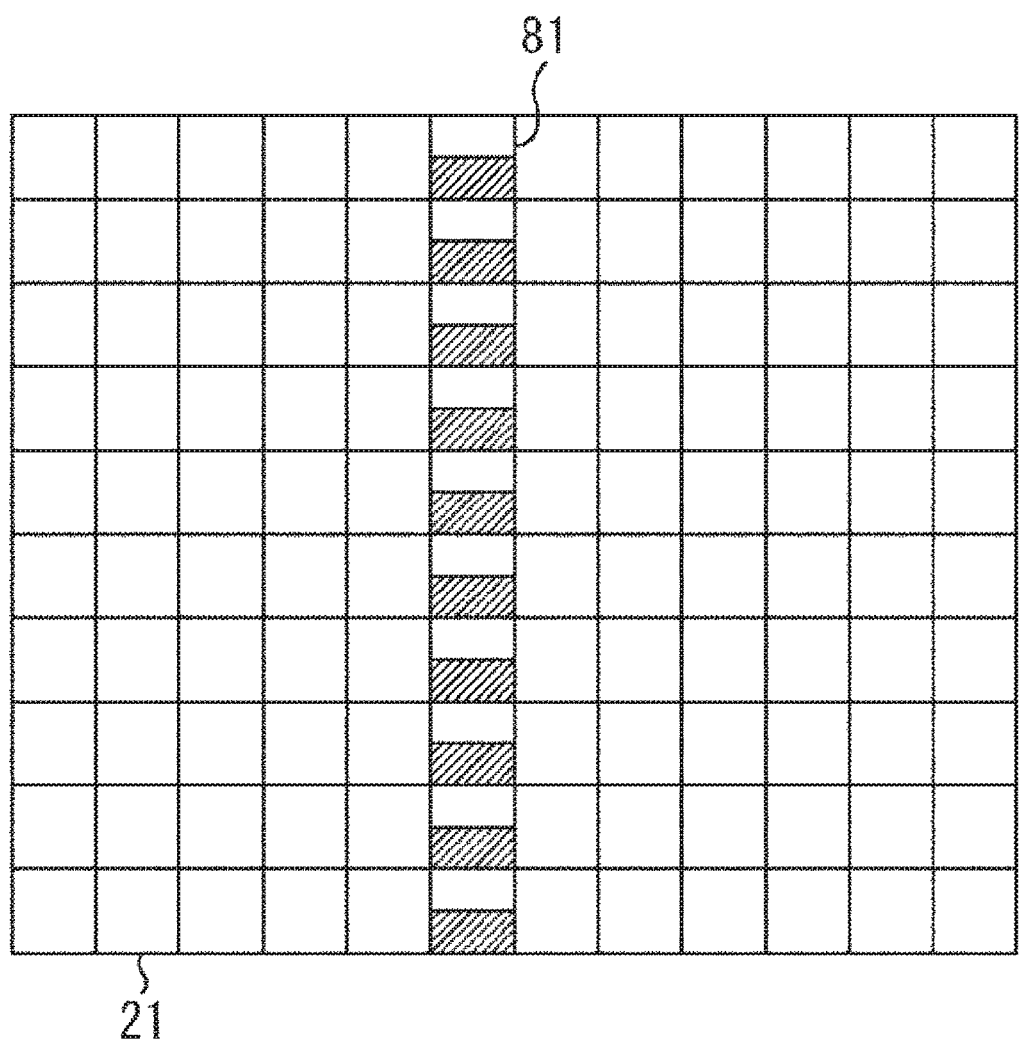
FIG. 13 is a diagram showing a fifth arrangement example of light-shielded pixels in a pixel unit.

FIG. 13 shows still another arrangement example (fifth arrangement example) of light-shielded pixels in the pixel unit 21. In the fifth arrangement example, lower-side light-shielded pixels 81, a lower side of the light receiving surface of which is shielded from light, are successively arranged in a straight line in the light-shielded direction (in this case, the vertical direction as the lower side is shielded from light). In this embodiment, it is not necessary to arrange the light-shielded pixels in pairs, and therefore, even in the fifth arrangement example, a phase difference can be detected without a problem.

Figure 14:
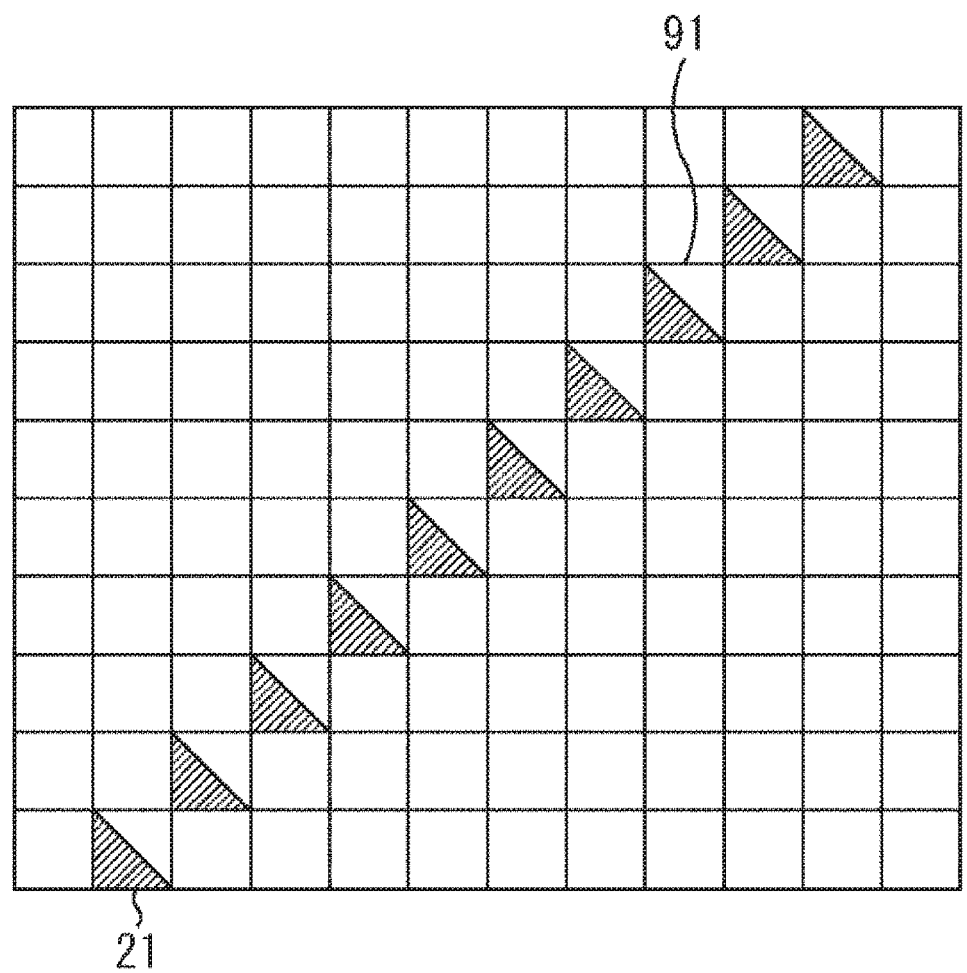
FIG. 14 is a diagram showing a sixth arrangement example of light-shielded pixels in a pixel unit.

FIG. 14 shows still another arrangement example (sixth arrangement example) of light-shielded pixels in the pixel unit 21. In the sixth arrangement example, lower-left-side light-shielded pixels 91, a lower left side of the light receiving surface of which is shielded from light, are successively arranged in a straight line in the light-shielded direction (in this case, the diagonal up-right direction as the lower left side is shielded from light). In this embodiment, it is not necessary to arrange the light-shielded pixels in pairs, and therefore, even in the sixth arrangement example, a phase difference can be detected without a problem.

Figure 15:
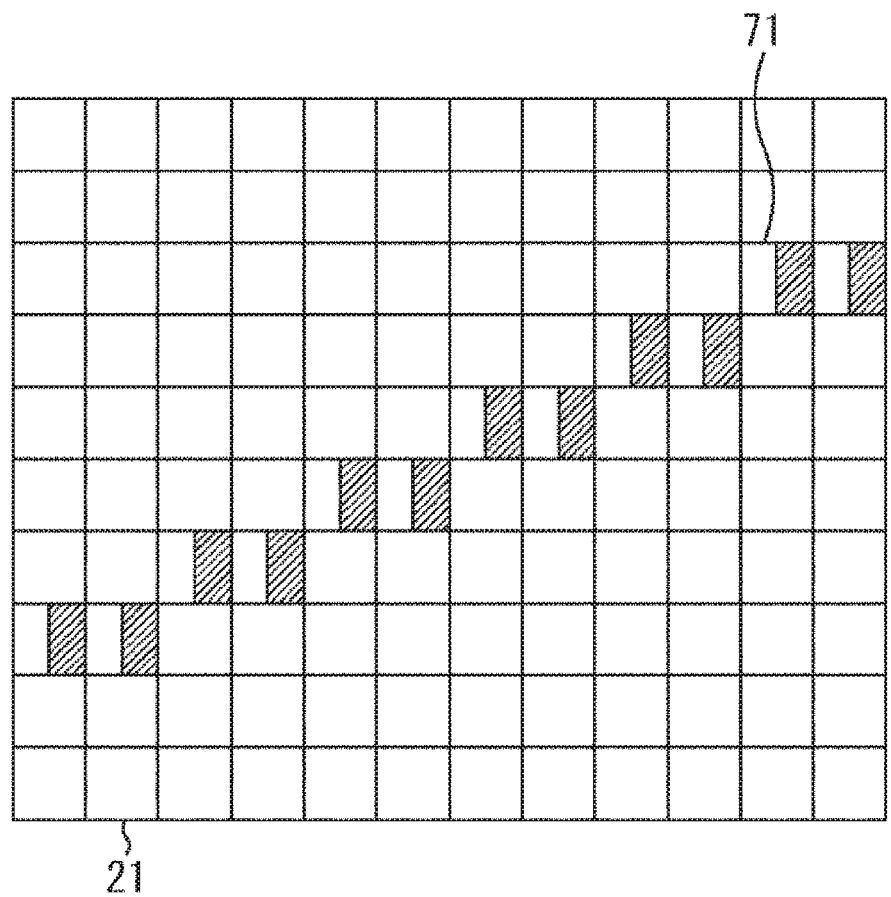
FIG. 15 is a diagram showing a seventh arlangement example of light-shielded pixels in a pixel unit.

FIG. 15 shows still another arrangement example (seventh arrangement example) of light-shielded pixels in the pixel unit 21. In the seventh arrangement example, right-side light-shielded pixels 71, aright side of the light receiving surface of which is shielded from light, are regularly arranged in a plurality of lines. In this embodiment, it is not necessary to arrange the light-shielded pixels in pairs, and therefore, even in the seventh arrangement example, a phase difference can be without a problem.

Figure 16:
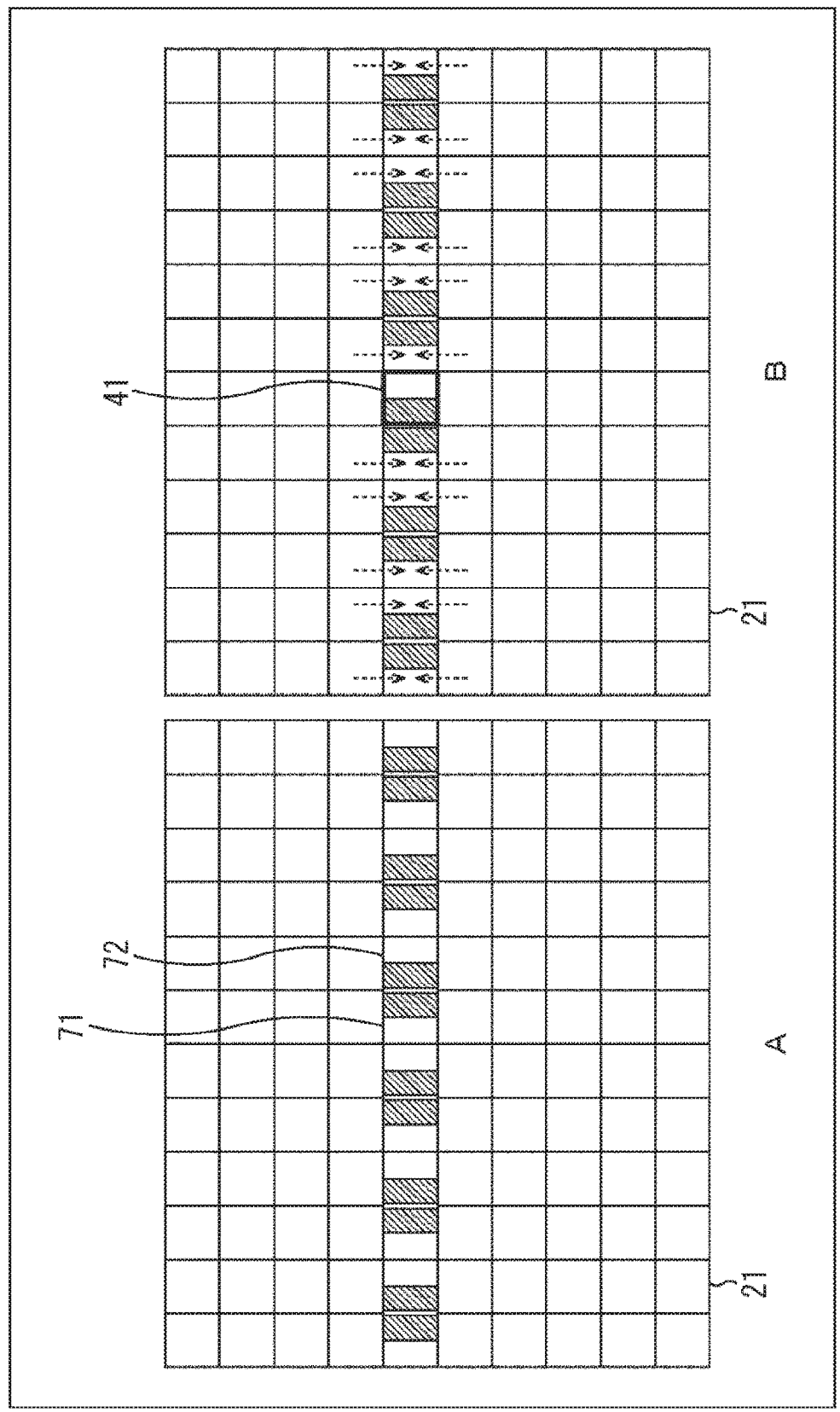
FIG. 16 is a diagram showing an eighth arrangement example of light-shielded pixels in a pixel unit.

FIG. 16A shows another arrangement example (eighth arrangement example) of light-shielded pixels in the pixel unit 21. In the eighth arrangement example, right-side light-shielded pixels 71, a right side of the light receiving surface of which is shielded from light, and left-side light-shielded pixels 72, a left side of the light receiving surface of which is shielded from light, are densely arranged in pairs in a straight line in the light-shielded direction. In this embodiment, a light-shielded pixel of interest and normal pixels located in the light-shielded direction are used and therefore, if no measures are taken, there is a lack of normal pixels, and therefore, a phase difference can be detected. Therefore, as shown in FIG. 16B, the pixel values of pixels located in the light-shielded direction of a light-shielded pixel 41 as a pixel of interest are each estimated using the pixel values of normal pixels located above and below that pixel, and are used to detect a phase difference.

Figure 17:
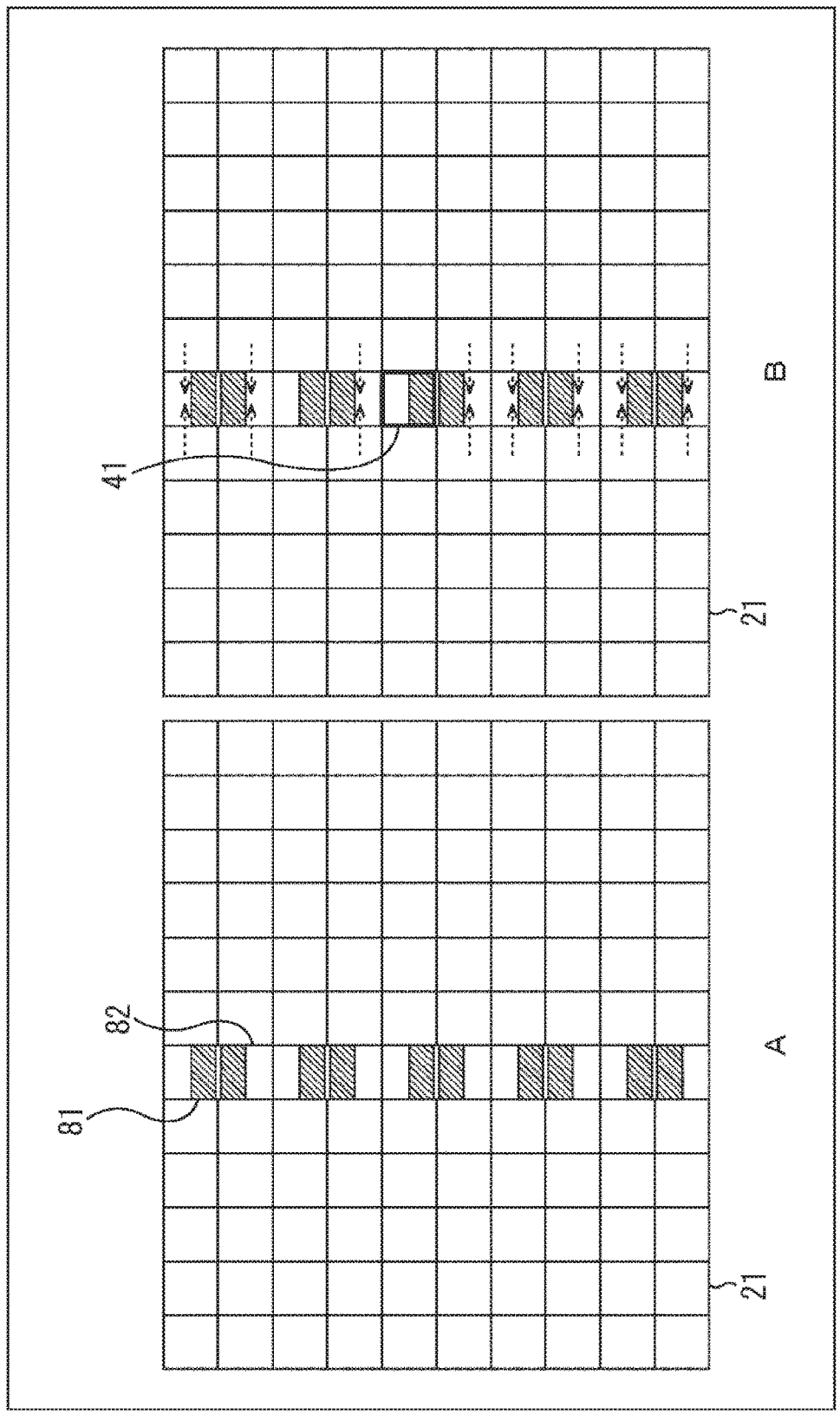
FIG. 17 is a diagram showing a ninth arrangement example of light-shielded pixels in a pixel unit.

FIG. 17A shows another arrangement example (ninth arrangement example) of light-shielded pixels in the pixel unit 21. In the ninth arrangement example, lower-side light-shielded pixels 81, a lower side of the light receiving surface of which is shielded from light, and upper-side light-shielded pixels 82, an upper side of the light receiving suiface of which is shielded from light, are densely arranged in a straight line in the light-shielded direction. In this embodiment, a light-shielded pixel of interest and normal pixels located in the light-shielded direction are used, and therefore, if no measures are taken, there is a lack of normal pixels, and therefore, a phase difference can be detected. Therefore, as shown in FIG. 17B, the pixel values of pixels located in the light-shielded direction of a light-shielded pixel 41 as a pixel of interest are each estimated using the pixel values of normal pixels located to the right and left of that pixel, and are used to detect a phase difference.

Figure 18:
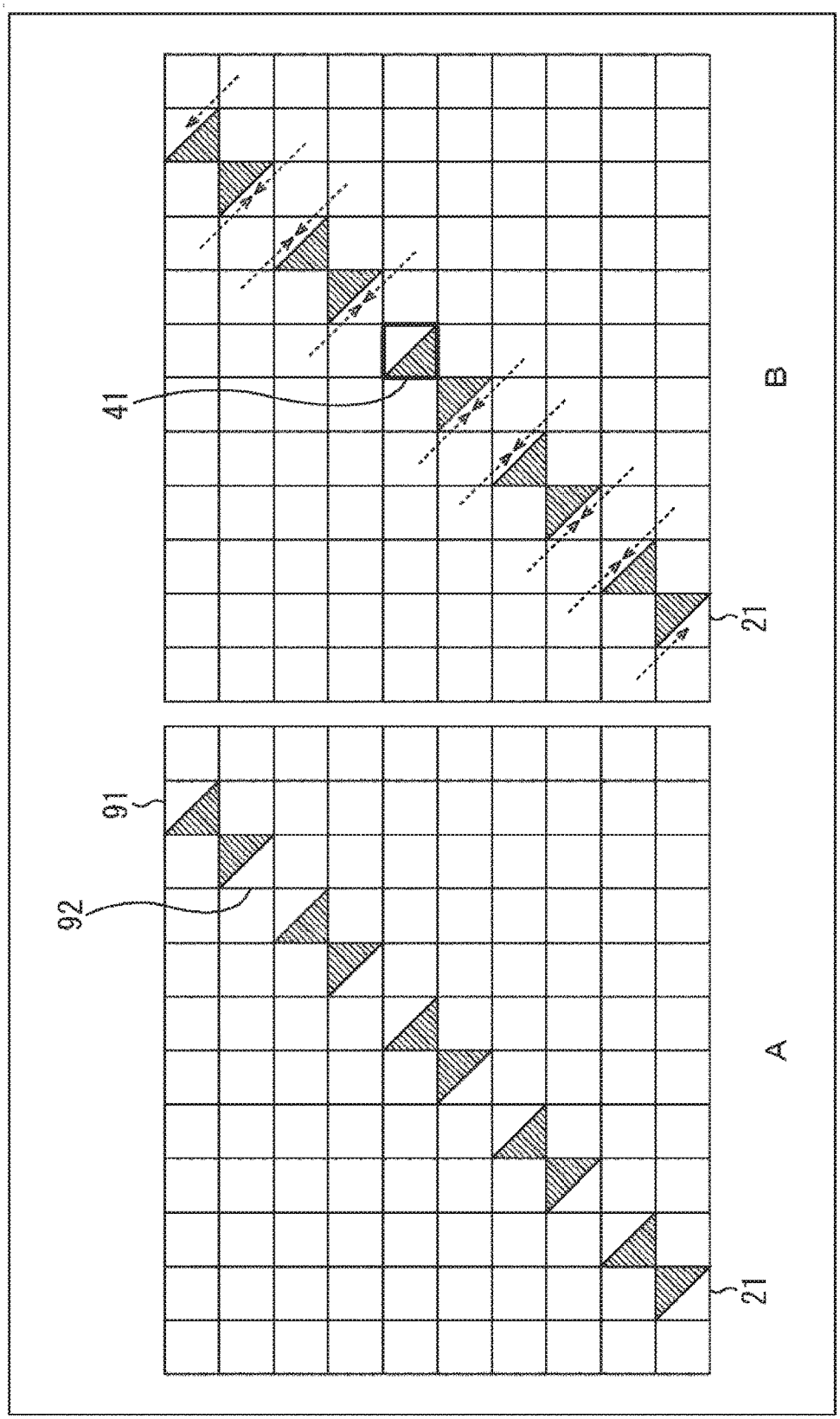
FIG. 18 is a diagram showing a tenth arrangement example of light-shielded pixels in a pixel unit.

FIG. 18A shows another arrangement example (tenth arrangement example) of light-shielded pixels in the pixel unit 21. In the tenth arrangement example, lower-left-side light-shielded pixels 91, a lower left side of the light receiving surface of which is shielded from light, and upper-right-side light-shielded pixels 92, an upper right side of the light receiving surface of which is shielded from light, are densely arranged in pairs in a straight line in the light-shielded direction. In this embodiment, a light-shielded pixel of interest and normal pixels located in the light-shielded direction are used, and therefore, if no measures are taken, there is a lack of normal pixels, and therefore, a phase difference can be detected. Therefore, as shown in FIG. 18B, the pixel values of pixels located in the light-shielded direction of a light-shielded pixel 41 as a pixel of interest are each estimated using the pixel values of a normal pixel located above and to the left of that pixel and a normal pixel located below and to the right of that pixel, and are used to detect a phase difference.

Figure 19:
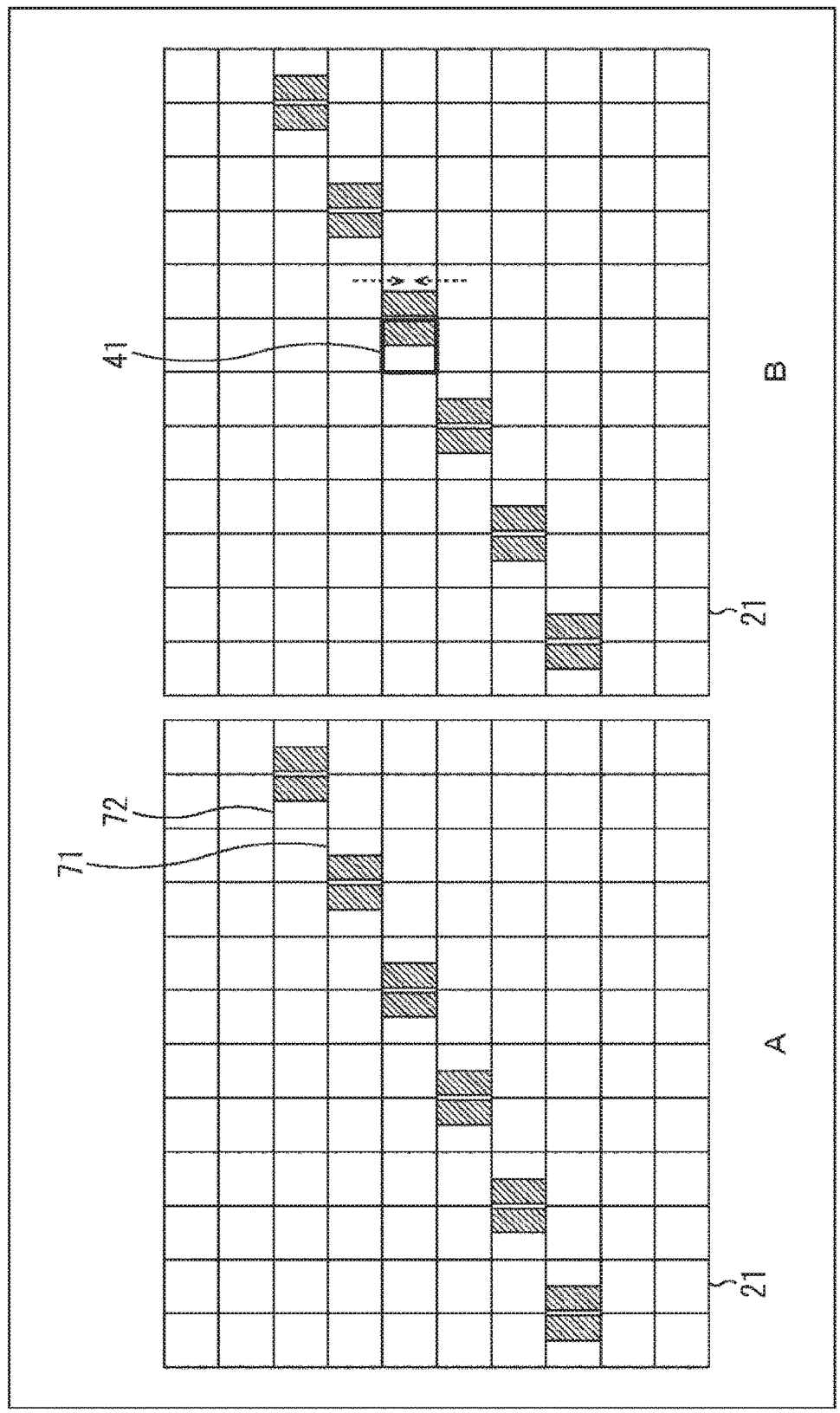
FIG. 19 is a diagram showing an 11th arrangement example of light-shielded pixels in a pixel unit.
Figure 20:
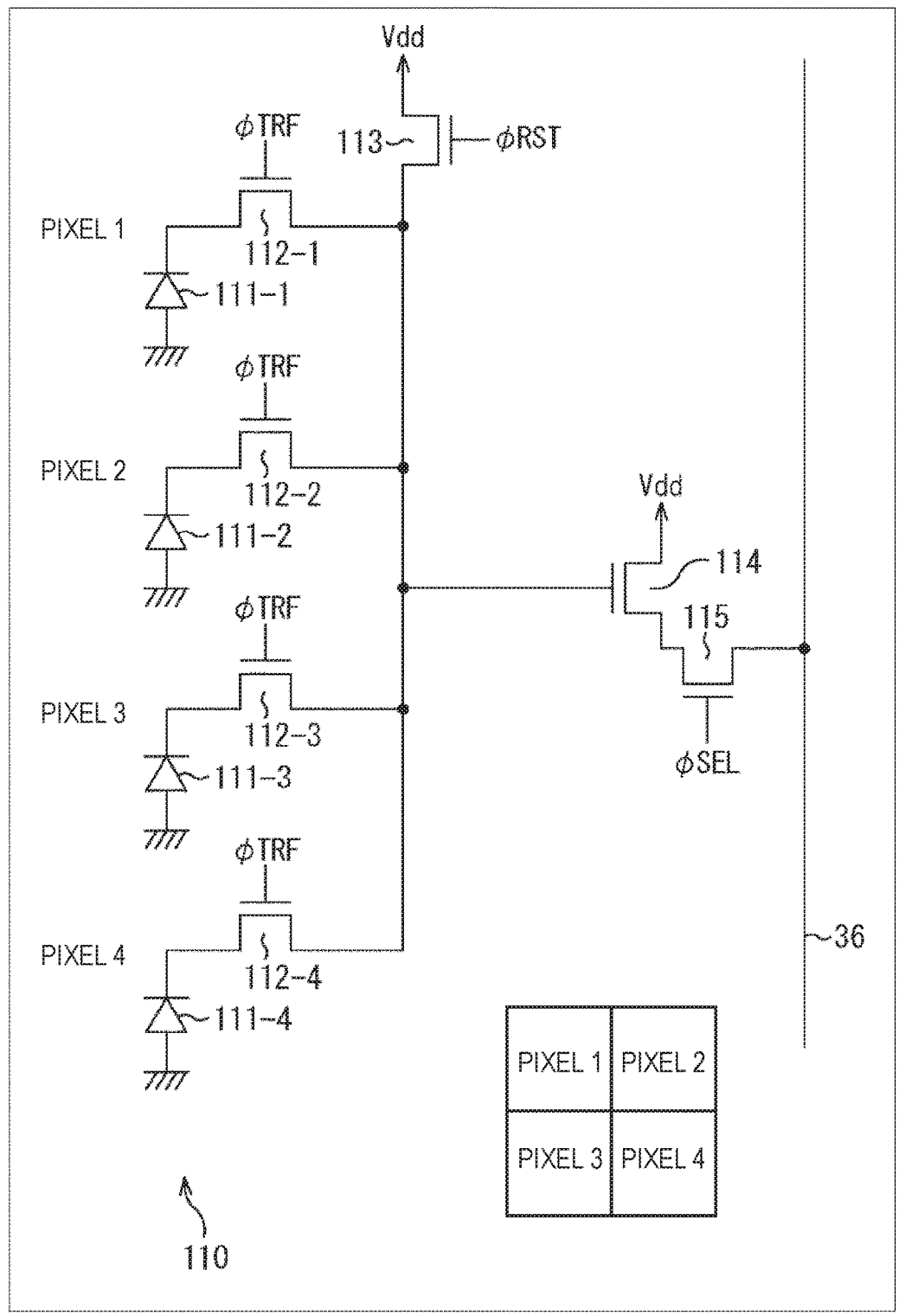
FIG. 20 is a circuit diagram showing a configuration example of a shared-by-4-pixels type CMOS image sensor.

FIG. 19A shows another arrangement example (eleventh arrangement example) of light-shielded pixels in the pixel unit 21. In the eleventh arrangement example, right-side light-shielded pixels 71, a right side of the light receiving surface of which is shielded form light, and left-side light-shielded pixels 72, a left side of the light receiving surface of which is shielded from light, are arranged in pairs in a plurality of lines. In this embodiment, a light-shielded pixel of interest and normal pixels located in the light-shielded direction are used, and therefore, the pixel value of a pixel located adjacent to a light-shielded pixel 41 as a pixel of interest in the light-shielded direction is estimated using the pixel values of normal pixels above and below that pixel, and is used to detect a phase difference.

<Application Example of Image Sensor 13 of this Embodiment>

The image sensor 13 of this embodiment is applicable to both the front-illuminated type and the back-illuminated type.

Also, the image sensor 13 of this embodiment is applicable to both the 3-transistor type and the 4-transistor type.

Furthermore, the image sensor 13 of this embodiment is applicable to a CMOS image sensor which is configured so that an FD is shared by a plurality of pixels, such as, for example, a shared-by-4-pixels type CMOS image sensor 110.

Figure 21:
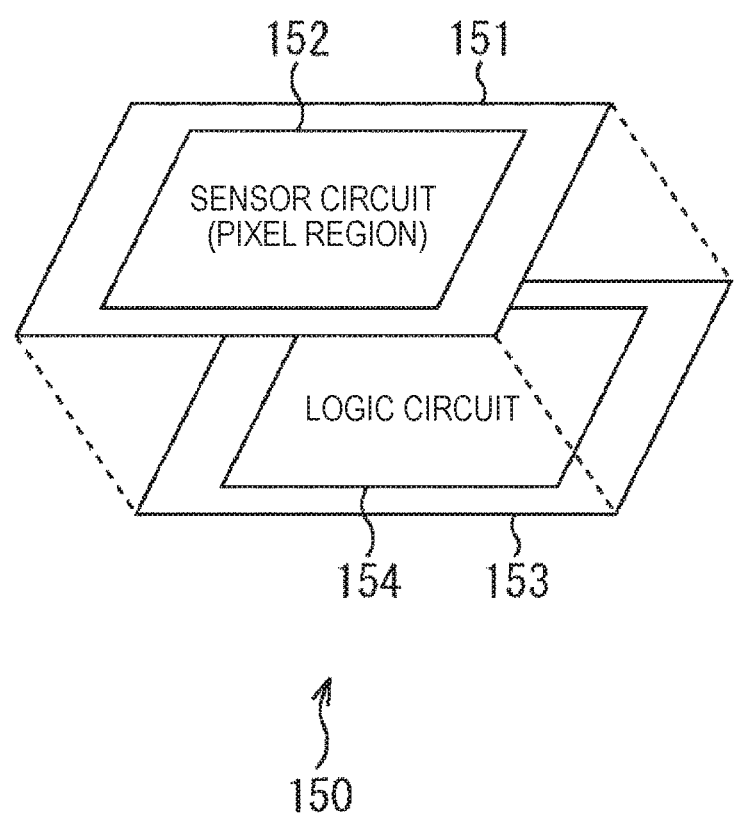
FIG. 21 is a block diagram showing a configuration example of a multilayer type CMOS image sensor.

Also, furthermore, the image sensor 13 of this embodiment is applicable to a multilayer type CMOS image sensor 150 in which a substrate 151 on which a sensor circuit 152 (corresponding to the pixel unit 21) is formed and a substrate 153 on which a logic circuit 154 (corresponding to the phase difference signal generation unit 22 and the like) are put on top of each other, such as, for example, that shown in FIG. 21.

Note that the image sensor 13 of this embodiment is applicable to not only imaging apparatuses but also any electronic devices that have an imaging function.

Embodiments of the present disclosure are not limited to the embodiments which have been described above. Various changes can be made without departing from the spirit and scope of the present disclosure.

Additionally, the present technology may also be configured as below.

(1)
An image sensor including:
a pixel unit in which light-shielded pixels are arranged among normal pixels arranged in a matrix;
a setting unit configured to determine texture around the light-shielded pixel as a pixel of interest present in a region of interest, and set a weighting coefficient on the basis of the texture;
a calculation unit configured to calculate a correlation value between a pixel value of the light-shielded pixel as the pixel of interest and a pixel value of the normal pixel around the light-shielded pixel; and
a generation unit configured to multiply the correlation value calculated for the light-shielded pixel by the weighting coefficient, and calculate integration for the light-shielded pixels present in the region of interest, to generate a degree-of-correlation histogram.

(2)
The image sensor according to (1),
wherein the generation unit further detects a phase difference between the light-shielded pixel present in the region of interest and the normal pixel around the light-shielded pixel, on the basis of the generated degree-of-correlation histogram.

(3)
The image sensor according to (1) or (2),
wherein the setting unit generates a normal pixel line located in a light-shielded direction of the light-shielded pixel while the light-shielded pixel as the pixel of interest is set as a center of the normal pixel line, determines texture of the normal pixel line, and sets the weighting coefficient based on the texture.

(4)
The image sensor according to (3),
wherein the setting unit generates, by interpolation, a normal pixel line located in a light-shielded direction of the light-shielded pixel while the light-shielded pixel as the pixel of interest is set as a center of the normal pixel line, the normal pixel line having same color as a color of the light-shielded pixel.

(5)
The image sensor according to (3) or (4),
wherein the setting unit removes noise of the generated normal pixel line, determines texture of the normal pixel line after the noise removal, and sets the weighting coefficient on the basis of the texture.

(6)
The image sensor according to any of (1) to (5),
the setting unit performs, as the texture determination, at least one of dynamic range determination, monotonic increase/decrease determination, or saturation determination.

(7)
The image sensor according to any of (1) to (6), further including:
a selection unit configured to select the region of interest.

(8)
The image sensor according to (7),
wherein the selection unit selects the region of interest on the basis of a section selected by a user in a screen which is divided into a plurality of sections.

(9)
The image sensor according to (8),
wherein the selection unit extracts, as the region of interest, regions having a uniform depth in the section selected by the user.

(10)
The image sensor according to any of (1) to (8),
wherein the calculation unit corrects a luminance value of the light-shielded pixel as the pixel of interest, and calculates a correlation value between the luminance value after the correction and a luminance value of the normal pixel around the light-shielded pixel.

(11)
The image sensor according to any of (1) to (9),
wherein the generation unit calculates a degree of reliability of the detected phase difference on the basis of the generated degree-of-correlation histogram.

(12)
The image sensor according to any of (1) to (10),
wherein, in the pixel unit, either first light-shielded pixels having a first region of a light receiving surface shielded from light or second left-side light-shielded pixels having a second region of a light receiving surface shielded from light, the second region being different from the first region, are arranged sparsely in a light-shielded direction, and regularly and uniformly throughout a screen.

(13)
The image sensor according to any of (1) to (10),
wherein, in the pixel unit, either first light-shielded pixels having a first region of a light receiving surface shielded from light or second left-side light-shielded pixels having a second region of a light receiving surface shielded from light, the second region being different from the first region, are arranged randomly throughout a screen.

(14)
The image sensor according to any of (1) to (10),
wherein, in the pixel unit, both first light-shielded pixels having a first region of a light receiving surface shielded from light and second left-side light-shielded pixels having a second region of a light receiving surface shielded from light, the second region being different from the first region, are arranged randomly throughout a screen.

(15)
The image sensor according to any of (1) to (10),
wherein, in the pixel unit, either first light-shielded pixels having a first region of a light receiving surface shielded from light or second left-side light-shielded pixels having a second region of a light receiving surface shielded from light, the second region being different from the first region, are arranged in a straight line in a light-shielded direction.

(16)
The image sensor according to any of (1) to (10),
wherein, in the pixel unit, both first light-shielded pixels having a first region of a light receiving surface shielded from light and second left-side light-shielded pixels having a second region of a light receiving surface shielded from light, the second region being different from the first region, are arranged in pairs in a straight line in a light-shielded direction.

(17)
The image sensor according to any of (1) to (10),
wherein, in the pixel unit, either first light-shielded pixels having a first region of a light receiving surface shielded from light or second left-side light-shielded pixels having a second region of a light receiving surface shielded from light, the second region being different from the first region, are arranged in a plurality of lines.

(18)
The image sensor according to any of (1) to (10),
wherein, in the pixel unit, both first light-shielded pixels having a first region of a light receiving surface shielded from light and second left-side light-shielded pixels having a second region of a light receiving surface shielded from light, the second region being different from the first region, are arranged in pairs in a plurality of lines.

(19)
A method for calculating phase differences between light-shielded pixels and normal pixels around the light-shielded pixels in an image sensor including a pixel unit in which the light-shielded pixels are arranged among the normal pixels arranged in a matrix, the method including:
a setting step of determining texture around the light-shielded pixel as a pixel of interest present in a region of interest, and setting a weighting coefficient on the basis of the texture;
a calculation step of calculating a correlation value between a pixel value of the light-shielded pixel as the pixel of interest and a pixel value of the normal pixel around the light-shielded pixel; and a detection step of multiplying the correlation value calculated for the light-shielded pixel by the weighting coefficient, calculating integration for the light-shielded pixels present in the region of interest, to generate a degree-of-correlation histogram, and detecting a phase difference between the light-shielded pixel present in the region of interest and the normal pixel around the light-shielded pixel, on the basis of the generated degree-of-correlation histogram, wherein the steps are performed by the image sensor.

(20) An electronic device including an image sensor, wherein the image sensor includes a pixel unit in which light-shielded pixels are arranged among normal pixels arranged in a matrix, a setting unit configured to determine texture around the light-shielded pixel as a pixel of interest present in a region of interest, and set a weighting coefficient on the basis of the texture, a calculation unit configured to calculate a correlation value between a pixel value of the light-shielded pixel as the pixel of interest and a pixel value of the normal pixel around the light-shielded pixel, and a generation unit configured to multiply the correlation value calculated for the light-shielded pixel by the weighting coefficient, and calculate integration for the light-shielded pixels present in the region of interest, to generate a degree-of-correlation histogram.

REFERENCE SIGNS LIST 10 imaging apparatus
11 optical lens unit
12 lens drive unit
13 image sensor
14 image data generation unit
15 recording unit
21 pixel unit
22 phase difference signal generation unit
31 region selection unit
32 texture determination unit
33 correlation calculation unit
34 phase difference calculation unit
41 light-shielded pixel

What is claimed is:

1. An image sensor comprising:
a pixel unit in which light-shielded pixels are arranged among normal pixels arranged in a matrix;
a logic circuit configured to:
determine texture around each light-shielded pixel that is a pixel of interest present in a region of interest, and set a weighting coefficient on the basis of the texture;
calculate a first correlation value between a pixel value of each light-shielded pixel that is a pixel of interest and pixel values of normal pixels around each light-shielded pixel that is a pixel of interest; and
multiply the first correlation value by the weighting coefficient, and calculate integration for light-shielded pixels present in the region of interest, to generate a degree-of-correlation histogram; and
detect a phase difference between the light-shielded pixels present in the region of interest and the normal pixels around the light-shielded pixels on the basis of the generated degree-of-correlation histogram.

2. The image sensor according to claim 1,
wherein logic circuit is configured to generate a normal pixel line located in a light-shielded direction of the light-shielded pixels while each light-shielded pixel that is a pixel of interest is set as a center of the normal pixel line, and determine the texture as a texture of the normal pixel line.

3. The image sensor according to claim 2,
wherein the logic circuit is configured to generate the normal pixel line by interpolation, the normal pixel line having same color as a color of the light-shielded pixel.

4. The image sensor according to claim 2,
wherein the logic circuit is configured to remove noise of the generated normal pixel line, and determine the texture of the normal pixel line after the noise removal.

5. The image sensor according to claim 2,
wherein the logic circuit is configured to perform, as the texture determination, at least one of dynamic range determination, monotonic increase/decrease determination, or saturation determination.

6. The image sensor according to claim 1, wherein the logic circuit is configured to select the region of interest.

7. The image sensor according to claim 6,
wherein the logic circuit is configured to select the region of interest on the basis of a section selected by a user in a screen which is divided into a plurality of sections.

8. The image sensor according to claim 7,
wherein the logic circuit is configured to extract, as the region of interest, regions having a uniform depth in the section selected by the user.

9. The image sensor according to claim 1,
wherein the logic circuit is configured to correct a luminance value of each light-shielded pixel that is a pixel of interest, and calculate a second correlation value between the luminance value after the correction and a luminance value of the normal pixels around the light-shielded pixels.

10. The image sensor according to claim 1,
wherein the logic circuit is configured to calculate a degree of reliability of the detected phase difference on the basis of the generated degree-of-correlation histogram.

11. The image sensor according to claim 1,
wherein, in the pixel unit, either first light-shielded pixels having a first region of a light receiving surface shielded from light or second light-shielded pixels having a second region of a light receiving surface shielded from light are arranged sparsely in a light-shielded direction, and regularly and uniformly throughout a screen, the second region being different from the first region.

12. The image sensor according to claim 1,
wherein, in the pixel unit, either first light-shielded pixels having a first region of a light receiving surface shielded from light or second light-shielded pixels having a second region of a light receiving surface shielded from light are arranged randomly throughout a screen, the second region being different from the first region.

13. The image sensor according to claim 1,
wherein, in the pixel unit, both first light-shielded pixels having a first region of a light receiving surface shielded from light and second light-shielded pixels having a second region of a light receiving surface shielded from light are arranged randomly throughout a screen, the second region being different from the first region.

14. The image sensor according to claim 1,
wherein, in the pixel unit, either first light-shielded pixels having a first region of a light receiving surface shielded from light or second light-shielded pixels having a second region of a light receiving surface shielded from light are arranged in a straight line in a light-shielded direction, the second region being different from the first region.

15. The image sensor according to claim 1,
wherein, in the pixel unit, both first light-shielded pixels having a first region of a light receiving surface shielded from light and second light-shielded pixels having a second region of a light receiving surface shielded from light are arranged in pairs in a straight line in a light-shielded direction, the second region being different from the first region.

16. The image sensor according to claim 1,
wherein, in the pixel unit, either first light-shielded pixels having a first region of a light receiving surface shielded from light or second light-shielded pixels having a second region of a light receiving surface shielded from light are arranged in a plurality of lines.

17. The image sensor according to claim 1,
wherein, in the pixel unit, both first light-shielded pixels having a first region of a light receiving surface shielded from light and second light-shielded pixels having a second region of a light receiving surface shielded from light are arranged in pairs in a plurality of lines.

18. A method for calculating phase differences between light-shielded pixels and normal pixels around the light-shielded pixels in an image sensor including a pixel unit in which the light-shielded pixels are arranged among the normal pixels arranged in a matrix, the method comprising:
a setting step of determining texture around each light-shielded pixel that is a pixel of interest present in a region of interest, and setting a weighting coefficient on the basis of the texture;
a calculation step of calculating a correlation value between a pixel value of each light-shielded pixel that is a pixel of interest and pixel values of normal pixels around each light-shielded pixel that is a pixel of interest; and
a detection step of i) multiplying the correlation value by the weighting coefficient, and calculating integration for light-shielded pixels present in the region of interest, to generate a degree-of-correlation histogram, and ii) detecting a phase difference between the light-shielded pixels present in the region of interest and the normal pixels around the light-shielded pixels, on the basis of the generated degree-of-correlation histogram,
wherein the steps are performed by the image sensor.

19. An electronic device comprising:
an image sensor, wherein the image sensor includes:
a pixel unit in which light-shielded pixels are arranged among normal pixels arranged in a matrix; and
a logic circuit configured to:
determine texture around each light-shielded pixel that is a pixel of interest present in a region of interest, and set a weighting coefficient on the basis of the texture;
calculate a correlation value between a pixel value of each light-shielded pixel that is the pixel of interest and pixel values of normal pixels around each light-shielded pixel that is a pixel of interest;
multiply the correlation value by the weighting coefficient, and calculate integration for light-shielded pixels present in the region of interest, to generate a degree-of-correlation histogram; and
detect a phase difference between the light-shielded pixels present in the region of interest and the normal pixels around the light-shielded pixels on the basis of the generated degree-of-correlation histogram.

* * * * *